(12) United States Patent
David et al.

(10) Patent No.: US 9,977,144 B2
(45) Date of Patent: May 22, 2018

(54) NESTED TUBULAR ANALYSIS VIA ELECTROMAGNETIC LOGGING

(71) Applicant: Schlumberger Technology Corporation, Sugar Land, TX (US)

(72) Inventors: Martin David, Clamart (FR); Saad Omar, Somerville, MA (US); Dzevat Omeragic, Lexington, MA (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days. days.

(21) Appl. No.: 15/265,992

(22) Filed: Sep. 15, 2016

(65) Prior Publication Data

US 2018/0074220 A1    Mar. 15, 2018

(51) Int. Cl.
*G01V 3/26* (2006.01)
*G01V 3/38* (2006.01)

(52) U.S. Cl.
CPC . *G01V 3/26* (2013.01); *G01V 3/38* (2013.01)

(58) Field of Classification Search
CPC .................................. G01V 3/26; G01V 3/38
See application file for complete search history.

(56) References Cited

U.S. PATENT DOCUMENTS

| | | | |
|---|---|---|---|
| 7,960,969 B2 | 6/2011 | Mouget et al. | |
| 8,332,191 B2 | 12/2012 | Rosthal et al. | |
| 8,614,578 B2 | 12/2013 | Gao et al. | |
| 8,958,989 B2 | 2/2015 | Legendre et al. | |
| 9,715,034 B2 | 7/2017 | Omeragic et al. | |
| 2013/0193953 A1 | 8/2013 | Yarbro et al. | |
| 2015/0204648 A1* | 7/2015 | Nichols | G01B 7/10 324/229 |
| 2015/0338541 A1 | 11/2015 | Nichols et al. | |
| 2016/0245779 A1* | 8/2016 | Khalaj Amineh | E21B 47/00 |
| 2017/0176630 A1 | 6/2017 | David et al. | |

OTHER PUBLICATIONS

T.M. Brill, et al. "Electromagnetic casing Inspection tool for corrosion evaluation", International Petroleum Technology Conference, Bangkok, Feb. 7-9, 2012 (14 pages).
J.F. Cuthbert and W.M. Johnson, "New Casing Inspection Log", Society of Petroleum Engineers, Jan. 1974. doi: 10.2118/5090-MS (11 pages).
T.R. Schmidt, "The casing Inspection Tool—An instrument for the In-Situ Detection of External Casing Corrosion in Oil Wells", Corrosion: Jul. 1961, vol. 17. No. 7, pp. 329t-333t.
Xu Wu and T.M. Habashy, "Influence of Steel Casing on Electromagnetic Signals," Geophysics, vol. 59, No. 3, Mar. 1994, pp. 378-390.

* cited by examiner

*Primary Examiner* — Clayton E LaBalle
*Assistant Examiner* — Jas Sanghera
(74) *Attorney, Agent, or Firm* — Michael Dae

(57) ABSTRACT

Methods and apparatus for analyzing nested tubulars via electromagnetic (EM) logging. An example method includes operating an EM logging tool within tubulars nested within a wellbore. The EM logging tool includes an EM transmitter and multiple EM receivers. Data obtained via the EM receivers is utilized to estimate an individual thickness of each tubular at each of multiple depths within the wellbore. The estimated individual thicknesses are utilized to estimate a cumulative thickness of the tubulars at each depth. Local variations of the estimated cumulative thicknesses are utilized to distinguish between actual and spurious indications of differences between the estimated individual thicknesses at neighboring depths.

19 Claims, 13 Drawing Sheets

NESTED TUBULAR ANALYSIS VIA ELECTROMAGNETIC LOGGING

BACKGROUND OF THE DISCLOSURE

In well logging via electromagnetic (EM) analysis, an EM logging tool is inserted into an interior diameter of a casing joint ("casing") or other conductive tubular. A transmitter of the EM logging tool creates an EM field that interacts with the tubular and varies depending on a wall thickness (hereafter simply "thickness") of the tubular. One or more receivers of the EM logging tool may be used to measure and generate a data log illustrating variations in one or more resulting and returning EM fields. The thickness of the tubular may be determined by analyzing the detected variations in the data log. An area of the tubular that is determined to have less thickness may indicate a defect in the tubular (e.g., due to corrosion). However, due to a physical design of the EM logging tool, the defect may appear more than once (as a "ghost") on the data log.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a method that includes operating an EM logging tool within multiple tubulars nested within a wellbore. The downhole tool includes an EM transmitter, a first EM receiver, and a second EM receiver. A first apparent cumulative thickness of the tubulars is determined employing data generated via the first EM receiver. A second apparent cumulative thickness of the tubulars is determined employing data generated via the second EM receiver. A deghosted thickness is produced as a minimum of the first and second apparent cumulative thicknesses. Collar-free sections of the tubulars are identified based on the deghosted thickness. For each collar-free section, an adjusted deghosted apparent cumulative thickness is produced by employing a maximum of the first and second apparent cumulative thicknesses. The adjusted deghosted apparent cumulative thickness is assigned to the first and second apparent cumulative thicknesses.

The present disclosure also introduces a method that includes operating an EM logging tool within multiple tubulars nested within a wellbore. The downhole tool includes an EM transmitter and an EM receiver. Apparent cumulative thicknesses of the tubulars are determined employing data generated via the EM receiver using measured phase and attenuation. Relative eccentering of the tubulars is identified based on separations of the apparent cumulative thicknesses from phase and attenuation occurring at the same depth.

The present disclosure also introduces a method that includes operating an EM logging tool within multiple tubulars nested within a wellbore. The downhole tool includes an EM transmitter and multiple EM receivers. Data obtained via the EM receivers is utilized to estimate an individual thickness of each tubular at each of multiple depths within the wellbore. The estimated individual thicknesses are utilized to estimate a cumulative thickness of the tubulars at each depth. Local variations of the estimated cumulative thicknesses are utilized to distinguish between actual and spurious indications of differences between the estimated individual thicknesses at neighboring depths.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the claims and/or other portions of the present disclosure.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
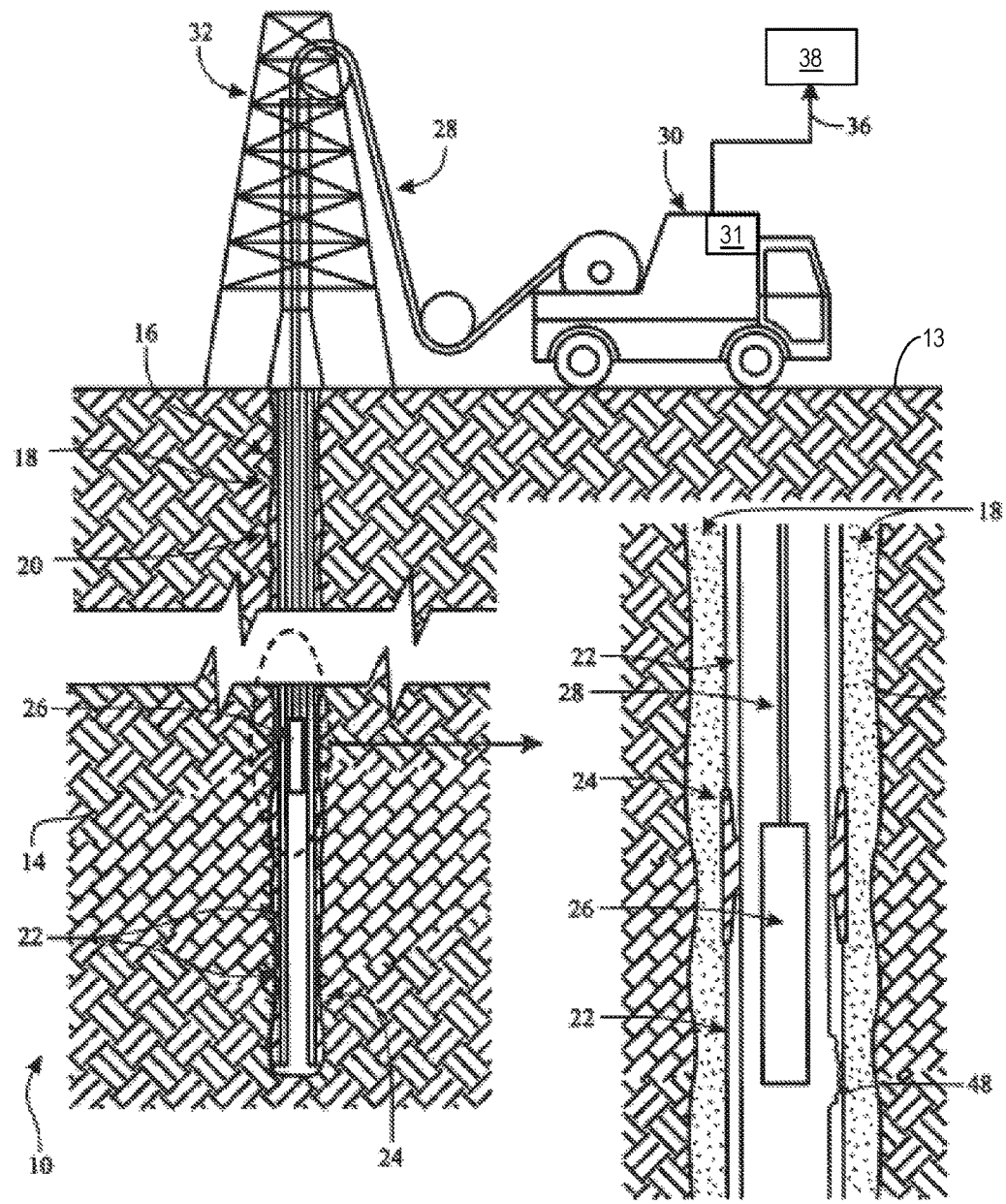
FIG. 1 is a schematic diagram of at least a portion of an example implementation of a system according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

When introducing elements of various implementations of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," "one implementation," or "an implementation" of the present disclosure are not intended to be interpreted as excluding the existence of additional embodiments and/or implementations that also incorporate the recited features.

One or more aspects of the present disclosure relate to systems and methods for measuring thicknesses and detecting defects in tubulars that may be generally concentrically arranged or otherwise nested within a wellbore, using an EM logging tool having at least one EM transmitter and at least two EM receivers. A defect may include a change (e.g., an increase or decrease) in thickness of one or more of the nested tubulars. The defect may appear more than once (as a "ghost") on a data log of measurements of the EM logging tool, such as may be due to axial spacing between the EM transmitter and receivers. One or more aspects of the present disclosure may relate to removing the ghosting effects using deconvolution techniques.

FIG. 1 is a schematic diagram of at least a portion of an example implementation of a system 10 for measuring tubular thickness using a downhole EM logging tool 26 according to one or more aspects of the present disclosure. Surface equipment 12 is located on a wellsite surface 13 above a geological formation 14 into which a wellbore 16 extends from the wellsite surface 13. An annular fill 18 has been used to seal an annulus 20 between the wellbore 16 and tubulars (e.g., casings) 22, such as via cementing operations. The EM logging tool 26 may be centered or eccentered, such that a measuring and/or detecting device (e.g., a transmitter or a receiver) of the EM logging tool 26 is positioned centrally or off-center relative to a central longitudinal axis of the tubulars 22.

The tubulars 22 may be coupled together by collars 24. The tubulars 22 represent lengths of pipe including threads and/or other means for connecting each end to threads and/or other connection means of an adjacent collar 24 and/or tubular 22. Each tubular 22 and/or collar 24 may be made of steel and/or other electrically conductive materials able to withstand a variety of forces, such as collapse, burst, and tensile failure, as well as chemically-aggressive fluid. Each tubular 22 and/or collar may have magnetic properties and be affected by an alternating EM current.

Figures 3, 4:
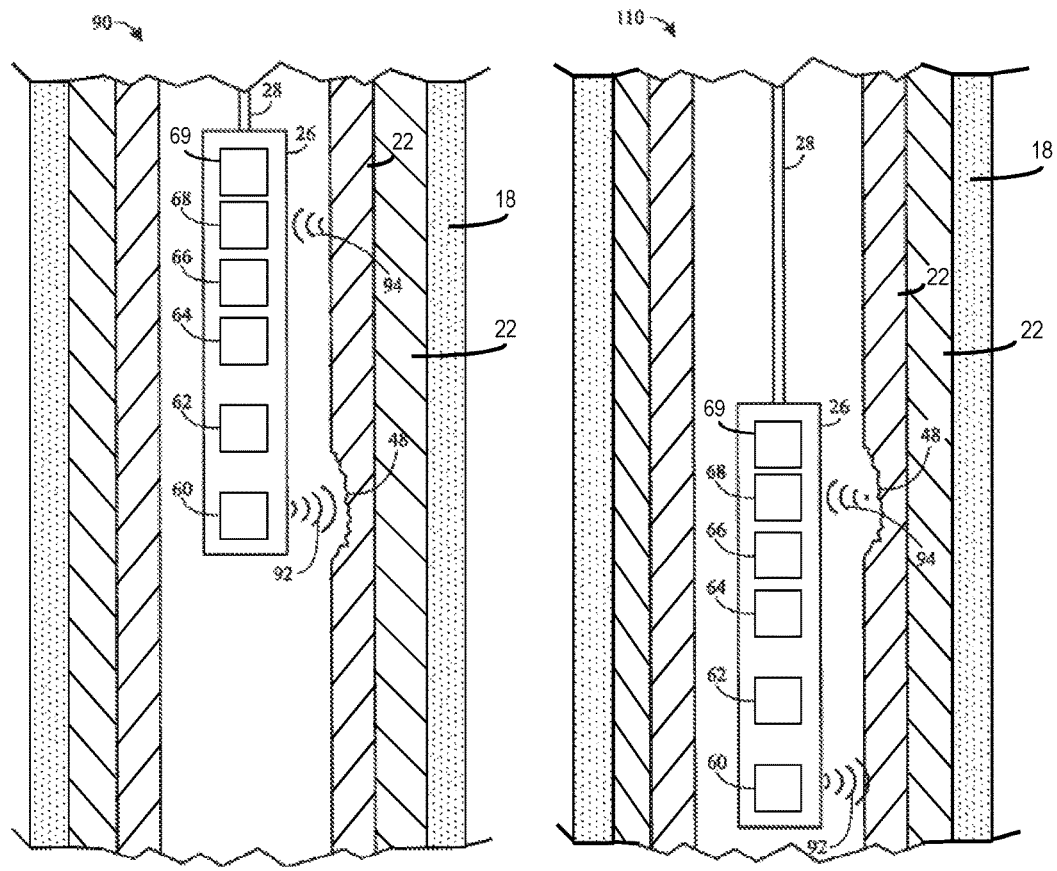
FIGS. 3 and 4 are schematic diagrams of the EM logging tool shown in FIG. 2.

The surface equipment 12 may carry out various well-logging operations to detect conditions of the tubulars 22, including implementations in which the tubulars 22 are concentrically nested, as shown in FIGS. 3 and 4. The well-logging operations may measure individual and/or cumulative thicknesses of the casings 22 by using the EM logging tool 26.

The EM logging tool 26 may be conveyed within the wellbore 16 by a cable 28. Such cable 28 may comprise one or more mechanical cables, electrical cables, and/or an electro-optical cables that include one or more fiber-optic lines protected against the harsh environment of the wellbore 16. However, the EM logging tool 26 may be conveyed using other conveyance means, such as coiled tubing or a tractor.

The EM logging tool 26 may generate a time-varying magnetic field signal that interacts with the tubulars 22. The EM logging tool 26 may be energized from the surface (e.g., via the cable 28) or have its own internal power used to emit the time-varying magnetic field signal. The magnetic field signal may travel outward from the EM logging tool 26 through and along the tubulars 22. The magnetic field signal from the EM logging tool 26 generates eddy currents in the tubulars 22, which produce corresponding returning magnetic field signals detected as magnetic field anomalies by the EM logging tool 26. Each measurement is denoted as a remote field eddy current (RFEC) if the transmitter-receiver spacing is substantially longer than about 2.5 times the outer diameter of the inspected tubular(s) 22. At a defect 48 in the tubular(s) 22, such as may be a result of metal gain or loss to the tubular 22, the returning magnetic field signal may arrive at the EM logging tool 26 with a change in phase and/or signal strength (e.g., amplitude), relative to the returning magnetic field signal not passing through the defect 48. The combined measurements of multiple receivers (RFEC, near-field, or transition zone) may be used to create a data log and determine individual and/or cumulative thicknesses of the tubulars 22 using suitable EM and/or field-testing analyses.

The EM logging tool 26 may be deployed inside the wellbore 16 by the surface equipment 12, which may include a vehicle 30 and a deploying system such as a drilling rig, workover rig, platform, derrick, and/or other surface structure 32. Data related to the tubulars 22 gathered by the EM logging tool 26 may be transmitted to the surface and/or stored in the EM logging tool 26 for later processing and analysis. The vehicle 30 may be fitted with and/or communicate with a data processing system 31 to perform data collection and analysis. When the EM logging tool 26 provides measurements to the surface equipment 12 (e.g., through the cable 28), the surface equipment 12 may pass the measurements as EM tubular evaluation data 36 to a data processing system 38. The data processing systems 31, 38 may each comprise one or more processors, memory devices, storage devices, and/or displays, such as may be implemented as at least a partial instance of the processing system 1300 described below with respect to FIG. 18.

The data processing system 38 may obtain the measurements from the EM logging tool 26 as raw data. However, the measurements may be processed or pre-processed by the EM logging tool 26 before being sent to the data processing system 38. Processing of the measurements may incorporate using and/or obtaining other measurements, such as from ultrasonic, caliper, and/or other EM logging techniques to better constrain unknown parameters of the tubulars 22. Accordingly, the data processing system 38 and/or the EM logging tool 26 may be utilized in acquiring additional information about the tubulars 22 and/or the wellbore 16, such as a number of tubulars 22, nominal thickness of each tubular 22, centering of the tubulars 22 relative to the wellbore 16, centering of the EM logging tool 26 within the wellbore 16, electromagnetic and/or ultrasonic properties of the tubulars 22, ambient and/or wellbore temperature, caliper measurements, and/or other parameters that may be utilized during thickness analyses of the tubulars 22.

Figure 2:
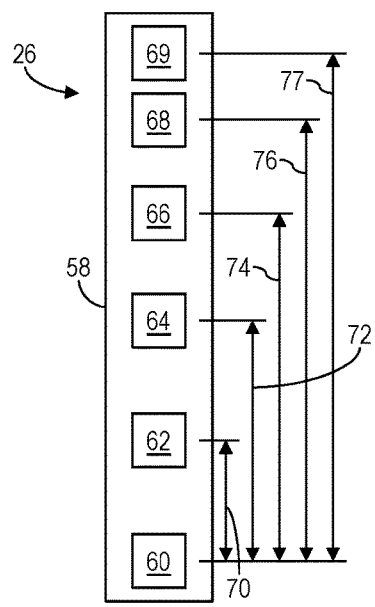
FIG. 2 is a schematic diagram of at least a portion of an example implementation of an EM logging tool according to one or more aspects of the present disclosure.

FIG. 2 is a schematic view of an example implementation of the EM logging tool 26 that may be utilized for casing and other tubular inspection within the scope of the present disclosure. The EM logging tool 26 may comprise a single EM transmitter 60 and five EM receivers 62, 64, 66, 68, 69. The transmitter 60 and receivers 62, 64, 66, 68, 69 may be enclosed within or otherwise carried with a housing 58. The housing 58 may be a pressure-resistant housing.

The receivers 62, 64, 66, 68, 69 may be operable by various magnetic field detection techniques, such as coiled-winding, Hall-effect sensor, giant magneto-resistive sensor, and/or other magnetic field measuring means. The receivers 62, 64, 66, 68, 69 may be axially aligned within the EM logging tool 26, as depicted in the example implementation shown in FIG. 2, or one or more of the receivers 62, 64, 66, 68, 69 may be radially or transversely offset along an axis of the EM logging tool 26. For example, one or more of the receivers 62, 64, 66, 68, 69 may be azimuthally offset towards or adjacent a perimeter of the EM logging tool 26. In such implementations, multiple receivers distributed azimuthally may permit generating a two-dimensional image of properties (e.g., thickness) of the tubular(s) 22. Implementations within the scope of the present disclosure may also comprise multiple transmitters, including where the windings of the multiple transmitters are transverse or oblique, as in a saddle coil arrangement, which couple to the receivers or additional receiver windings.

The receivers 62, 64, 66, 68, 69 are located at different distances away from the transmitter 60. For example, the receiver 62 may be located a distance 70 from the transmitter 60, the receiver 64 may be located a distance 72 from the transmitter 60, the receiver 66 may be located a distance 74 from the transmitter 60, the receiver 68 may located a distance 76 from the transmitter 60, and the receiver 69 may located a distance 77 from the transmitter 60. The distances 72, 74, and 76 may each be a multiple of the distance 70. For example, the distance 72 may be twice the distance 70. The receivers 62, 64, 66, 68, 69 may be located at distances of between 0 inches to 120 inches or more from the transmitter 60.

The receivers 62, 64, 66, 68, 69 may detect a strength and/or a phase of the returning magnetic field from the tubular(s) 22. The EM logging tool 26 and/or the data processing system 38 may use the detected values to create a data log and determine individual and/or cumulative thicknesses of the tubulars 22 utilizing various EM and/or field-testing analyses. For example, minimizing a norm of the difference (e.g., least-squares minimization) between the observed data and data from a numerical model may yield best-fit parameters for a model of the tubulars 22. Various solution implementations, such as inversion, model searching, simulated annealing, and/or other techniques may be used to interpret the data.

FIG. 3 is a schematic view of at least a portion of an example implementation of a system 90 for measuring thickness of tubulars 22 using the example implementation of the EM logging tool 26 shown in FIG. 2. As the EM logging tool 26 descends through the tubulars 22, the transmitter 60 generates a time-varying magnetic field signal 92 that interacts with the conductive tubulars 22. The magnetic field signal 92 travels outward from the transmitter 60 and then through and along the tubulars 22. The magnetic field signal 92 generates eddy currents in the tubulars 22, which produce corresponding returning magnetic field signals 94 detected by the receivers 62, 64, 66, 68, 69. As the transmitter 60 passes by the defect 48, the returning magnetic field signal 94 may arrive at the receiver 68 with a shift of phase and/or a change in signal strength (e.g., amplitude) relative to when the transmitter 60 is not passing by the defect 48. As the EM logging tool 26 travels further downhole within the tubulars 22, the receiver 68 passes by the defect 48, as shown in FIG. 4, and the returning magnetic field signal 94 may arrive at the receiver 68 with another phase shift and/or signal strength change. Thus, the defect 48 may be detected twice by the combination of the transmitter 60 and the receiver 68, including once when the transmitter 60 passed by the defect 48, and again when the receiver 68 passes by the defect. Other combinations of the transmitter 60 and other ones of the receivers 62, 64, 66, 69 may detect similar "ghosts" as the transmitters 60 and then the corresponding receiver pass by the defect 48. This phenomenon may also be observed at the collars 24 due to their increase of metal thickness when coupled to the tubulars 22, and also at other completion components.

Figure 5:
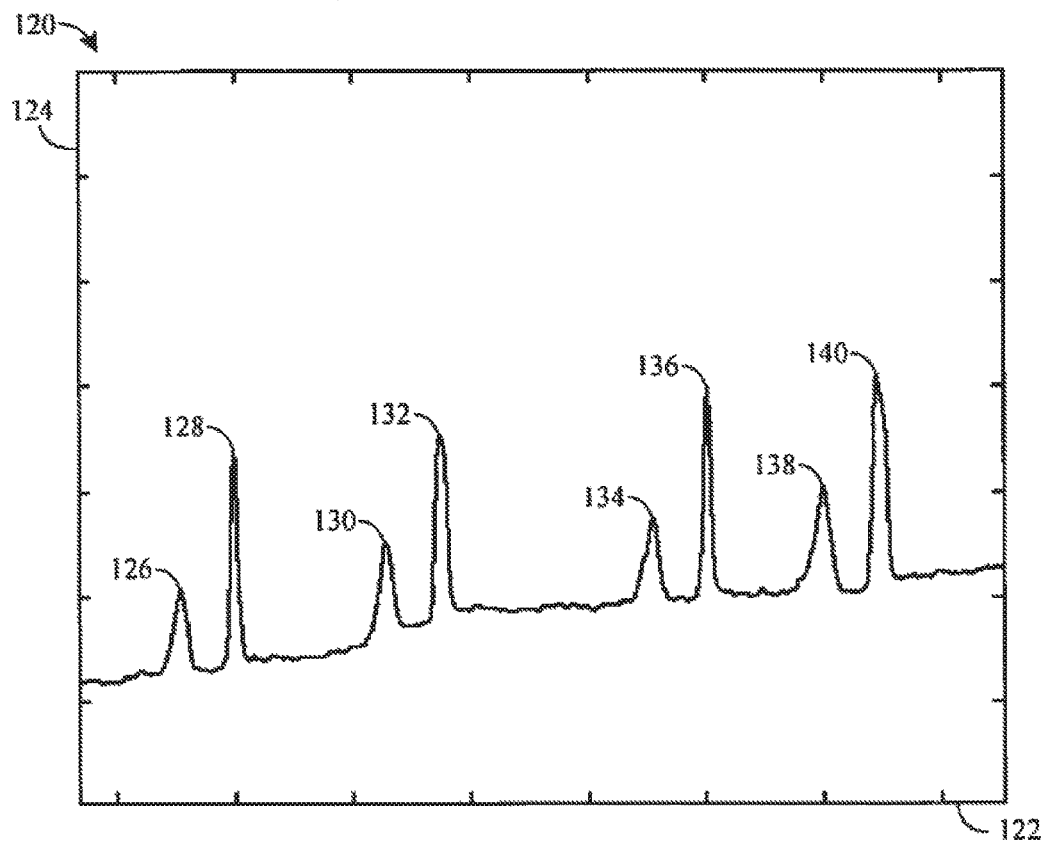
FIG. 5 is a plot of a returning magnetic field signal obtained by a receiver of an EM logging tool according to one or more aspects of the present disclosure.

FIG. 5 is a plot 120 of an example of the returning magnetic field signal 94 obtained by one of the receivers 62, 64, 66, 68, 69 of the EM logging tool 26 as the EM logging tool 26 travels in the tubulars 22. The horizontal axis 122 represents depth within the wellbore 16, and the vertical axis 124 represents signal strength.

As the EM logging tool descends in the wellbore 16, the EM logging tool 26 may pass a first defect in the casing 23, such as the defect 48 shown in FIGS. 3 and 4. As the transmitter 60 passes the first defect, a first amplitude spike 126 in the returning magnetic field signal strength occurs due to the change in thickness of the tubulars 22 that is attributable to the first defect. As the receiver passes the first defect (e.g., as shown in FIG. 4 where the receiver 68 passes the defect 48), a second amplitude spike 128 attributable to the first defect similarly occurs. However, because the transmitter 60 is longer than the receiver, the first amplitude spike 126 may be broader (i.e., extending over a greater range of depth 122 within the wellbore 16) and smaller in amplitude than the second amplitude spike 128, while the second amplitude spike 128 may appear sharper than the first amplitude spike 126. The first defect thus appears twice, and at locations up to several meters apart due to the transmitter 60 being spaced from the receiver by up to several meters.

Similarly, as the logging tool 26 continues descending in the wellbore 16, the EM logging tool 26 may pass a second defect in the tubulars 22. A third amplitude spike 130 may correspond to the transmitter 60 passing the second defect, and a fourth amplitude spike 132 may correspond to the receiver passing the second defect. As the EM logging tool 26 continues descending in the wellbore 16, the EM logging tool 26 may pass a third defect in the tubulars 22. A fifth amplitude spike 134 may correspond to the transmitter 60 passing the third defect, and a sixth amplitude spike 136 may correspond to the receiver passing the third defect. As the EM logging tool 26 continues descending in the wellbore 16, the EM logging tool 26 may pass a fourth defect in the tubulars 22. A seventh amplitude spike 138 may correspond to the transmitter 60 passing the fourth defect, and an eighth amplitude spike 140 may correspond to the receiver passing the fourth defect.

FIG. 5 illustrates the ghosting effect caused by the transmitter/receiver arrangement of the EM logging tool 26, whereby defects may be represented more than once in the data log. The ghosting effect is due to the defect appearing in the data log once (e.g., the first amplitude spike 126) when the transmitter 60 passes the defect, and again (e.g., the second amplitude spike 128) when the receiver passes the defect.

The present disclosure introduces one or more aspects pertaining to pre-processing of the measurement data to substantially remove the "ghosting" or double-indication of defects and other thickness changes. Such aspects may also relate to indicating the presence of eccentering of the tubulars 22 and/or the EM logging tool 26 within the tubulars 22 using shorter spacing measurements (attenuation and phase). Such aspects may also be utilized for symmetrized measurements. The concept of "apparent thickness" is also introduced herein, and is used to assign each measurement a unique thickness value. For RFEC measurements, apparent thickness gives the cumulative thickness of nested tubulars 22, assuming that the nominal sizes of the tubulars 22 change proportionally and/or one or more other assumptions.

The "deghosting" techniques assume that the RFEC measurements obtained via the EM logging tool 26 are calibrated with model responses for nominal sizes of tubulars 22 with known permeabilities and conductivities. An axi-symmetric model is used to generate EM logging tool responses. It includes physical and/or operational details of the EM logging tool, such as a magnetic core and non-uniform mandrel profile.

The deghosting method may perform one or more of the following tasks, whether simultaneously or separately:

Assign an apparent thickness to an RFEC measurement.

Remove double-indications of collars (e.g., collar 24 in FIG. 1) from RFEC measurements, assuming apparent thicknesses for at least two corresponding RFEC measurements are known.

Remove double-indications of corrosions and/or other defects from RFEC measurements, assuming apparent thicknesses for at least two corresponding RFEC measurements are known.

Indicate zones (i.e., depth ranges within the wellbore) where a tubular or the EM logging tool is eccentered using RFEC measurements from shorter transmitter/receiver spacings, assuming apparent thicknesses for these measurements are known.

Each induction measurement from the EM logging tool can be mapped to an apparent thickness. It corresponds to the effective amount of total metal seen by a specific receiver at a particular frequency. An example implementation of an EM logging tool (such as the EM logging tool 26 described above) may be capable of operating multiple frequencies. For example, the EM logging tool may operate at fundamental frequencies from about 0.1 Hz to about 200 Hz, or beyond, and may acquire data from multiple frequencies simultaneously or sequentially.

An apparent thickness lookup table is generated by simulating axi-symmetric model responses of the EM logging tool to proportionate changes in each tubular thickness, such as changes corresponding to 0.01 to 2.0 times the nominal thickness, among other examples.

Figure 6:
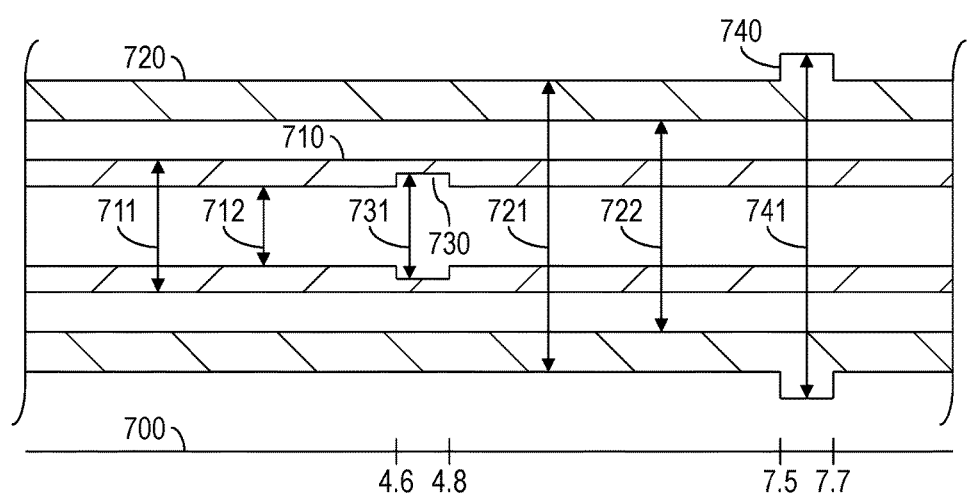
FIG. 6 is a schematic diagram of an example of nested tubulars according to one or more aspects of the present disclosure.

FIG. 6 is a sectional view of two representative tubulars 710, 720 in a synthetic example for the following description. A depth indicator 700 in FIG. 6 indicates depth within the wellbore. In the example shown in FIG. 6, each tubular 710, 720 represents the tubulars 22 described above. The inner tubular 710 has an outer diameter 711 (for example, about 11.4 cm) and an inner diameter 712 (e.g. about 10.3 cm), resulting in a nominal thickness (e.g. about 0.6 cm). The outer tubular 720 has an outer diameter 721 (e.g. about 17.8 cm) and an inner diameter 722 (e.g. about 15.9 cm), resulting in a nominal thickness (e.g. about 0.9 cm). The inner tubular 710 has an internal corrosion defect 730 mimicked as extending over a depth range (e.g. between about 4.6 m and about 4.8 m) and having a radial extent (e.g. about 0.3 cm), resulting in a local inner diameter 731 (e.g. about 10.9 cm). A thin collar 740 surrounding the outer tubular 720 is mimicked as extending over a depth range, for example, between about 7.5 m and about 7.7 m and having an outer diameter 741 (e.g. about 18.7 cm). The tubulars 710, 720 have a relative permeability $\mu_r$ (e.g. about 80), and a conductivity $\sigma$ (e.g. about $5 \times 10^6$ Siemens per meter (S/m)). Although only one example is shown in FIG. 6 and described herein, other examples can be devised by people skilled in the art with the benefit of the current disclosure.

Figure 7:
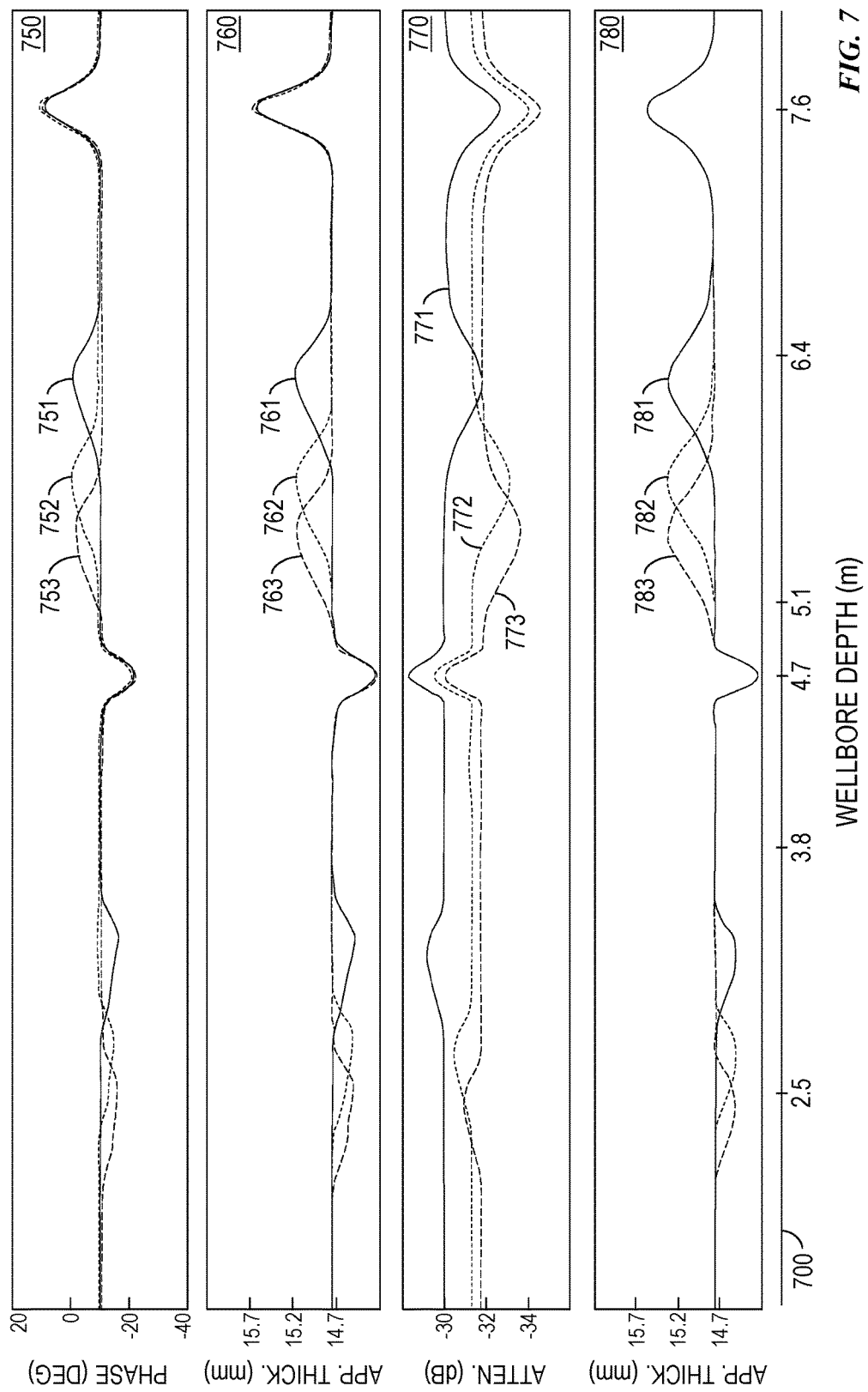
FIG. 7 is a plot illustrating synthetic data for the example tubulars shown in FIG. 6 according to one or more aspects of the present disclosure.

FIG. 7 includes four graphs 750, 760, 770, 780 of example synthetic data for the concentric tubulars 710, 720 shown in FIG. 6 hypothetically obtained by the EM logging tool 26 shown in FIG. 2. For this example, model responses were generated by increasing the thicknesses of both tubulars 710, 720 in steps of 1%, 2%, 5%, 20%, 40%, 180%, and 200% of their nominal thicknesses. Each graph 750, 760, 770, 780 is aligned with respect to wellbore depth 700. These response tables were used to determine the apparent thickness for each transmitter-receiver channel depicted in the graphs, namely, a first channel corresponding to the receiver 66, a second channel corresponding to the receiver 68, and a third channel corresponding to the receiver 69.

The graph 750 depicts the phase 751 detected by the receiver 66, the phase 752 detected by the receiver 68, and the phase 753 detected by the receiver 69. The graph 760 depicts the apparent thickness 761 determined via data acquired by the receiver 66, the apparent thickness 762 determined via data acquired by the receiver 68, and the apparent thickness 763 determined via data acquired by the receiver 69, each with respect to the transmitter 60 passing by the defects 730, 740 centered at respective wellbore depths of 4.7 m and 7.6 m. The graph 770 depicts the attenuation 771 detected by the receiver 66, the attenuation 772 detected by the receiver 68, and the attenuation 773 detected by the receiver 69. The graph 780 depicts the apparent thickness 781 determined via data acquired by the receiver 66, the apparent thickness 782 determined via data acquired by the receiver 68, and the apparent thickness 783 determined via data acquired by the receiver 69, each with respect to the receivers 66, 68, 69 passing by the defects 730, 740.

It is apparent from FIG. 7 that indications of the defects 730, 740 appear twice for each receiver channel, as described above. In addition, it is also clear that the apparent thickness readings are the same for each receiver channel when the transmitter and receivers cross the defects, which is a basis of the deghosting method described below.

The following description considers an EM logging tool (such as the EM logging tool 26 described above) having a transmitter T of length $L_T$ and two similar axial receivers R1 and R2 each of length $L_R$ and located at $P_{R1}$ and $P_{R2}$ unit lengths from a fixed transmitter point, such that $2.5 * OD_{max} < P_{R1} < P_{R2}$, where $OD_{max}$ is the outer diameter of the outermost tubular (e.g., outer tubular 720 in FIG. 6). The EM logging tool is used to detect a defect of axial extent $L_D$.

As described above, while the EM logging tool is conveyed within the wellbore, each receiver produces a double indication of the same defect, including a first indication for itself crossing the defect and a second indication (i.e., a "ghost") for the transmitter crossing the defect. From the principles of linear convolution, the axial extent of the response for the first indication is $L_R+L_D$, and the axial extent of the response for the second indication is $L_T+L_D$.

Figure 8:
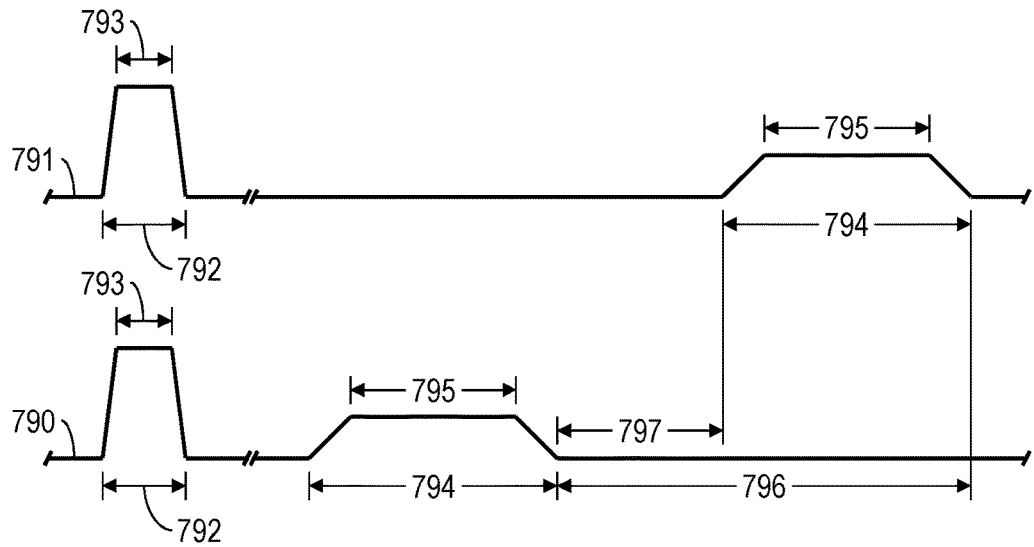
FIGS. 8 and 9 are schematic diagrams illustrating double indication of a tubular anomaly from an EM logging tool according to one or more aspects of the present disclosure.

This behavior of responses is schematically illustrated in FIG. 8, in which the R1 response 790 and the R2 response 791 are shown with respect to the position of the receivers R1 and R2, resulting in a shift 796 in the response 790 that is equal to the differences in axial separation of the receivers R1 and R2 from the transmitter (i.e., $P_{R2}-P_{R1}$). The R1 and R2 responses 790, 791 each depict a change in the cumulative thickness of the nested tubulars, wherein the change extends through an axial length 792 equal to the sum of the receiver length $L_R$ and the defect length $L_D$, and includes a peak extending through an axial length 793 equal to the receiver length $L_R$. The same change is depicted for when the transmitter passed, extending through an axial length

794 equal to the sum of the transmitter length $L_T$ and the defect length $L_D$, and includes a peak extending through an axial length 795 equal to the receiver length $L_R$. The distance 797 is equal to the axial separation of the receivers R1 and R2, minus the transmitter length $L_T$ and the defect length $L_D$ (i.e., $|P_{R2}-P_{R1}|-L_T-L_D$).

From RFEC theory, it is known that measured signals at both receivers are, to the first order, proportional to the cumulative thickness of the tubulars, and thus point to the same change in apparent thicknesses for the same defect. The present disclosure introduces utilizing this redundancy to remove ghosts as long as $L_D<(|P_{R2}-P_{R1}|-L_T)$, such that the defect length of defect $L_D$ is less than the difference between the transmitter length $L_T$ and the axial separation between the receivers. This is achieved by replacing the apparent thicknesses determined from R1 ghosts with the apparent thicknesses determined from R2 responses, and vice versa. These corrected apparent thicknesses are then used to obtain the deghosted phase and magnitude responses from the already constructed apparent thicknesses response tables described above.

From a given transmitter length, the expression $L_D<(|P_{R2}-P_{R1}|-L_T)$ also gives the minimum spacing between the receivers that will permit a predetermined longitudinal defect resolution against the ghosting effect.

Figure 9:
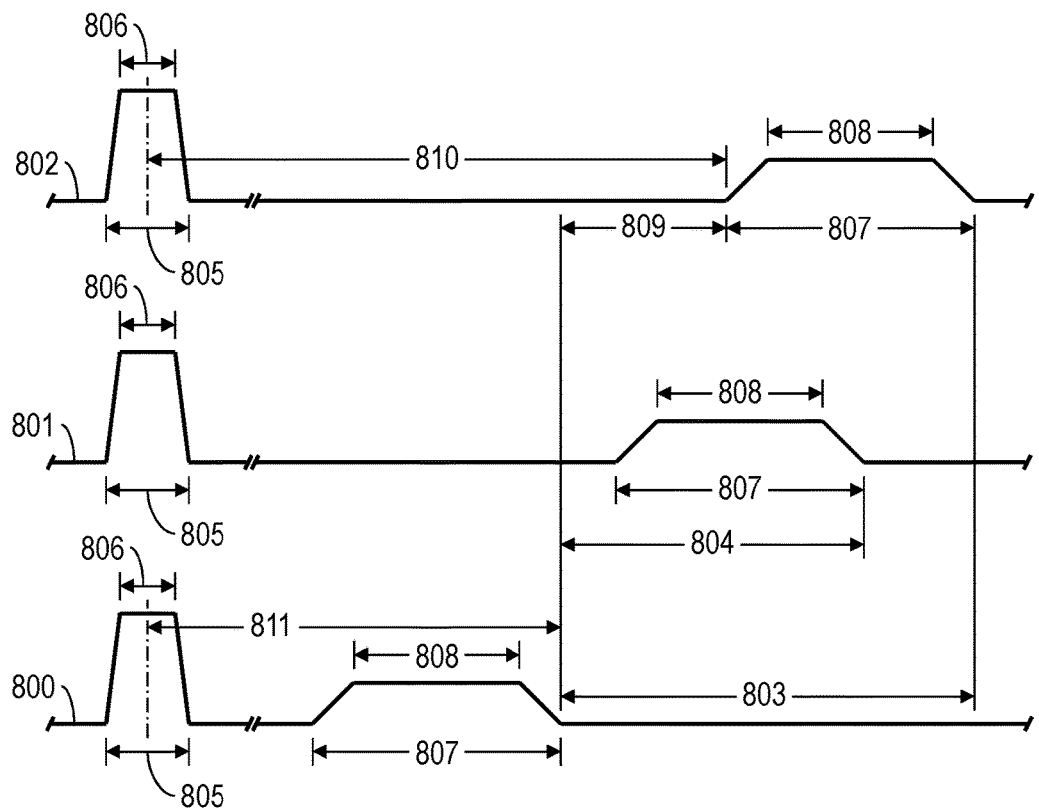

FIG. 9 is a schematic view of an example response 800 of the receiver 66 of the EM logging tool 26 shown in FIG. 2, an example response 801 of the receiver 68, and an example response 802 of the receiver 69. The responses 800-802 are shown with respect to the position of the receivers 66, 68, 69, resulting in a shift 803 in the response 800 that is equal to the differences in the midpoint offsets of the receivers 66 and 69 relative to the transmitter 60 (i.e., $P_{R69}-P_{R66}$), and a shift 804 in the response 801 that is equal to the differences in midpoint offsets of the receivers 68 and 69 relative to the transmitter 60 (i.e., $P_{R69}-P_{R68}$). The responses 800-802 each depict a change in the cumulative thickness of the nested tubulars, wherein the change extends through an axial length 805 equal to the sum of the receiver length $L_R$ and the defect length $L_D$, and includes a peak extending through an axial length 806 equal to the receiver length $L_R$. The same change is depicted for when the transmitter passed, extending through an axial length 807 equal to the sum of the transmitter length $L_T$ and the defect length $L_D$, and includes a peak extending through an axial length 808 equal to the receiver length $L_R$. The distance 809 is of a non-overlapping region between the transmitter ghost indications in the responses 800 and 802.

The start of the transmitter ghost on the response 802 of the receiver 69 is at a distance 810 from the center of the defect indication length 805. For example, if the receiver 69 is about $L_{69}$ in length, the transmitter 60 is about $L_{60}$ in length, and the midpoint offset of the transmitter 60 and the receiver 69 is about $D_{60-69}$ in length (such that the facing ends of transmitter 60 and the receiver 69 are axially separated by about $D_{60-69}-L_{69}/2-L_{60}/2$), then the distance 810 is the midpoint offset minus half the length of the transmitter 60 minus half the defect length LD, or $D_{60-69}-L_{60}/2-LD/2$. The end of the transmitter ghost on the response 800 of the receiver 66 is at a distance 811 from the center of the defect indication length 805. For example, if the receiver 66 is also about $L_{66}$ in length, and the midpoint offset of the transmitter 60 and the receiver 66 is about $D_{60-66}$ in length, then the distance 811 is the midpoint offset plus half the length of the transmitter 60 plus half the defect length LD, or about $D_{60-66}+L_{60}/2+LD/2$. Thus, the non-overlapping region distance 809 is $(D_{60-69}-L_{60}/2-LD/2)-(D_{60-66}+L_{60}/2+LD/2)$, or about $D_{60-69}-D_{60-66}-L_{60}-LD$, for exploiting the redundancy in the responses 800 and 802.

The receiver 64 may also be used instead of or in addition to the receiver 66. For example, if the midpoint offset of the transmitter 60 and the receiver 64 is about $D_{60-64}$, the non-overlapping region for exploiting the redundancy would be about $D_{60-69}-D_{60-64}-L_{60}-LD$.

The present disclosure introduces removing corrosion defect ghosts (indicating less metal than surrounding thicknesses) by taking the maximum of the apparent thicknesses indicated by two receivers of sufficient midpoint offset at each depth within the non-overlapping region, and removing collar ghosts (indicating more metal than surrounding thicknesses) by taking the minimum of the apparent thicknesses indicated by two receivers of sufficient midpoint offset at each depth within the non-overlapping region. In summary, differences in responses for two RFEC apparent thicknesses (referred to herein as $Th_1$ and $Th_2$) are observed, corresponding zones are identified as collar or corrosion defect ghosts, the ghosts are removed, and the deghosted responses are then obtained.

Figure 10:
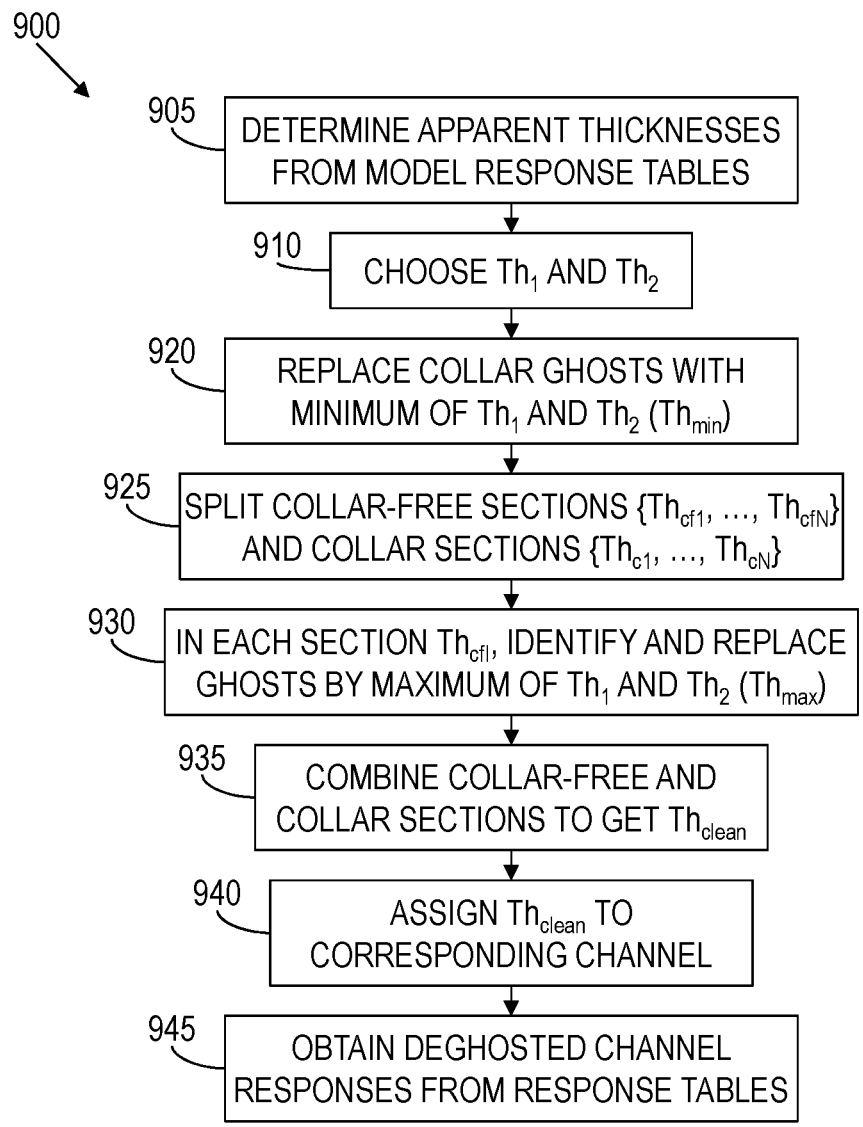
FIG. 10 is a flow-chart diagram of at least a portion of an example implementation of a deghosting method according to one or more aspects of the present disclosure.

FIG. 10 is a flow-chart diagram of at least a portion of an example implementation of a method (900) for performing the above-described deghosting. The deghosting method (900) generally comprises minimization and double-ghost removal. During the minimization, the minimum of the apparent thicknesses $Th_1$ and $Th_2$ is assigned to an array $Th_{min}$, including a minimum for phase and a minimum for attenuation-derived apparent thicknesses. This minimization removes the collar ghosts, due to the decreasing effect of defects on apparent thicknesses, and $Th_{min}$ has double the number of corrosion defect ghosts because apparent thicknesses from two receivers R1 and R2 are being used. The doubled ghosts resulting from the minimization are shown in curves 950 and 952 shown in FIG. 11.

The doubled ghosts are removed from $Th_{min}$ by replacing the ghosted apparent thicknesses with the maximum of the apparent thicknesses $Th_1$ and $Th_2$. To avoid reconstruction of collar ghosts, this replacement process is applied on collar-free sections of the $Th_{min}$ log. The collar-free sections are found by localizing collars in $Th_{min}$. Upon completion, each RFEC channel is assigned this deghosted $Th_{min}$ as apparent thickness, which is converted to receiver responses using model response tables. Upon "correcting" the channel apparent thicknesses, apparent thickness tables are used to retrieve the corresponding corrected raw channel responses.

Turning to FIG. 10, the method (900) includes determining (905) apparent thicknesses from model response tables that are produced employing a simulation of a transmitter and a receiver in nested tubulars. Apparent thicknesses ($Th_1$ and $Th_2$) of two RFEC channel responses are then chosen (910). The collar ghosts are then replaced (920) by $Th_{min}$, the minimum of $Th_1$ and $Th_2$ for each measurement station.

$Th_{min}$ is then split (925) into collar-free and collar sections, namely $\{Th_{cf1}, \ldots, Th_{cfN}\}$ and $\{Th_{c1}, \ldots, Th_{cN}\}$. In each collar-free section $Th_{cfi}$, corrosion defect ghosts are identified and replaced (930) by $Th_{max}$, the point-wise maximum of $Th_1$ and $Th_2$. Each collar-free $\{Th_{max1}, \ldots, Th_{maxN}\}$ and collar $\{Th_{c1}, \ldots, Th_{cN}\}$ section is then combined (935) in order to produce clean/corrected thicknesses $Th_{clean}$. $Th_{clean}$ is assigned (940) to each corresponding (phase or magnitude) far-field channels, and the deghosted channel responses are obtained (945) from the response tables described above.

Figure 11:
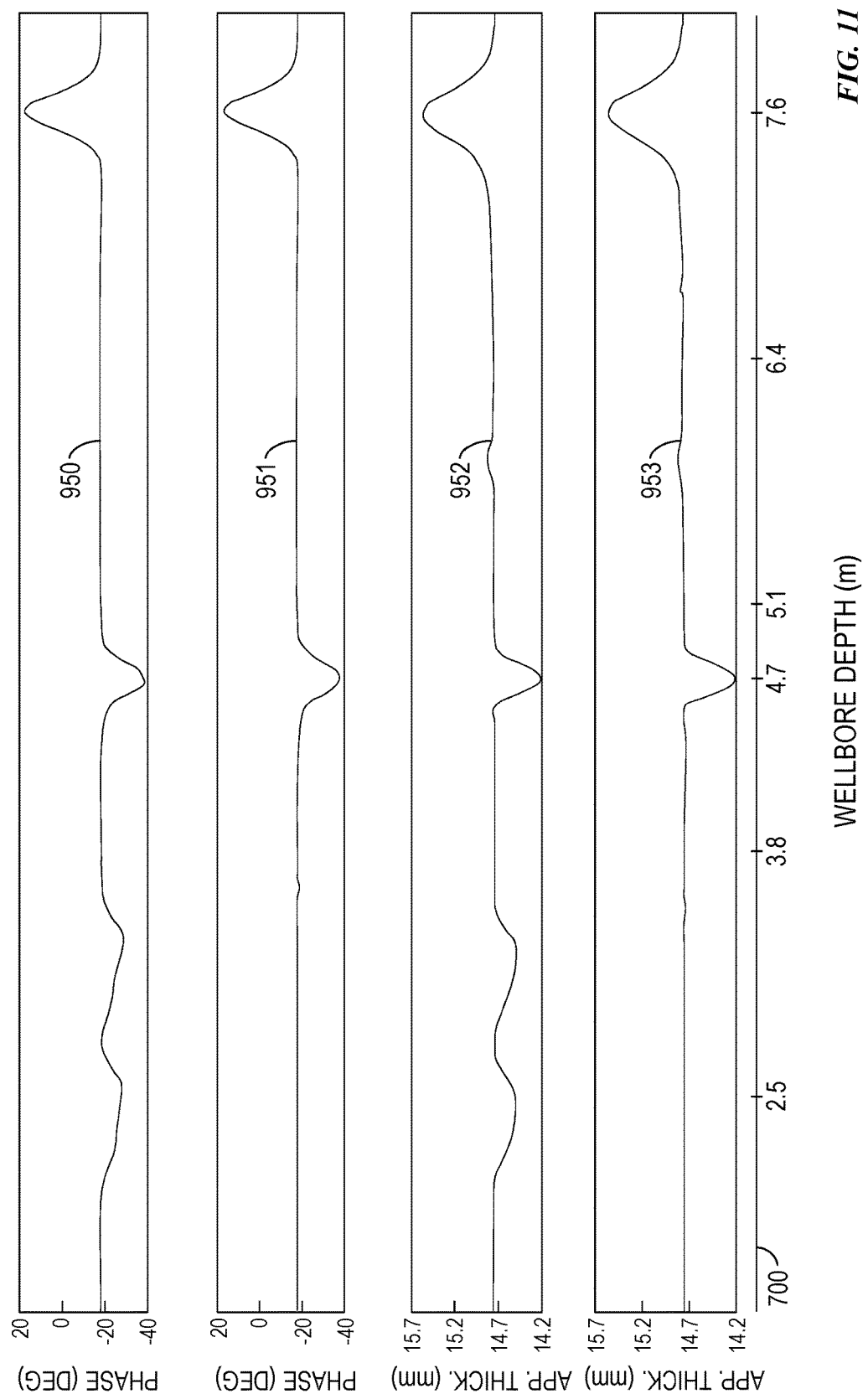
FIGS. 11-16 are graphs depicting one or more aspects of the present disclosure.

FIG. 11 includes plots of the example results of the method (900) applied to the example tubulars 710, 720 shown in FIG. 6. Curve 950 depicts results of using the deghosting described above to remove the collar ghosts from the phase responses of both receivers, as evident by comparison with the graph 750 of FIG. 7. Curve 951 depicts results of using the deghosting described above to remove the corrosion defect ghosts from the phase responses of both receivers, as evident by comparison with curve 950. Curve 952 depicts results of using the deghosting described above to remove the collar ghosts from the apparent thickness responses of both receivers, as evident by comparison with the graph 780 of FIG. 7. Curve 953 depicts results of using the deghosting described above to remove the corrosion defect ghosts from the apparent thickness responses of both receivers, as evident by comparison with curve 952.

The doubled corrosion defect ghosts resulting from the collar ghost removal, as described above, are also evident in the curves 950 and 952. It is worth pointing out that the monotonic nature of RFEC regime channel responses permits the unique conversions depicted in curves 951 and 953. The monotonic nature is also why the unique conversions cannot be applied to short spacing channel responses, because the above-described RFEC assumptions are not valid over short spacings.

Figure 12:
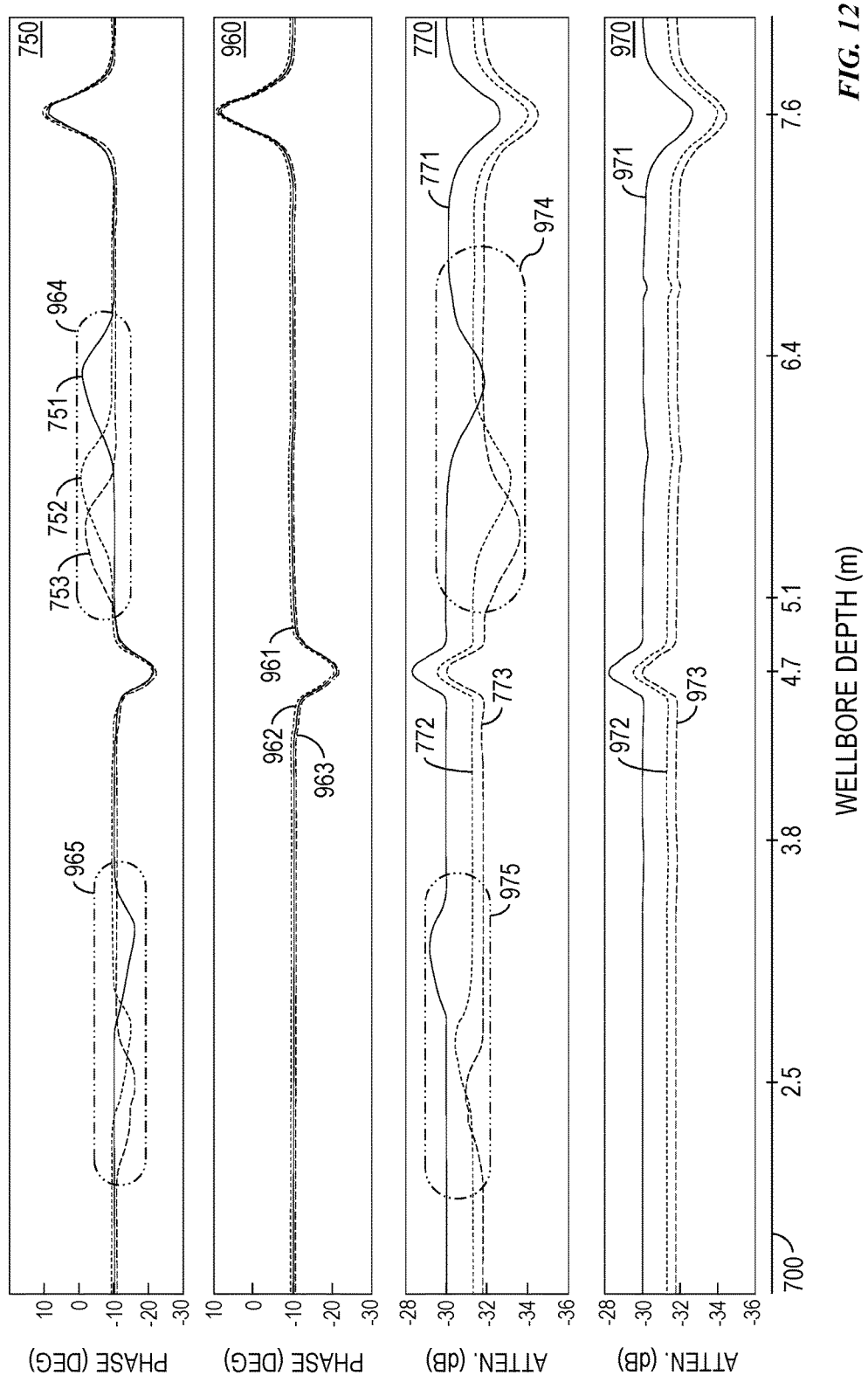

FIG. 12 depicts example results of the deghosting method on the synthetic data depicted in FIG. 7. The graphs 750 and 770 of FIG. 7 are reproduced in FIG. 12 for ease of comparison to the deghosting results. The graph 960 depicts the phase 961 detected by the receiver 66, the phase 962 detected by the receiver 68, and the phase 963 detected by the receiver 69, after collar ghosts 964 and corrosion defect ghosts 965 have been removed as described above. The graph 970 depicts the attenuation 971 detected by the receiver 66, the attenuation 972 detected by the receiver 68, and the attenuation 973 detected by the receiver 69, after collar ghosts 974 and corrosion defect ghosts 975 have been removed as described above.

As is evident from the previous discussion, each receiver contributes a number of apparent thicknesses equal to two (for phase and attenuation) times the number of excitation frequencies. The apparent thicknesses from short spacing receivers (i.e., for 2.5*ODmax>$P_R$) can also be utilized as an indicator of eccentering. For implementations comprising axisymmetric nested tubulars, each apparent thickness from a receiver reflects the change in parameters such as thickness, permeability, and conductivity, among others. Based on this principle, separation of apparent thickness differences in responses obtained via shorter spacing receivers can be used to indicate eccentering.

As an example, 39 synthetic data sets are presented corresponding to eccentering in three nested tubulars respectively having: outer diameters of 21.9 cm, 34.0 cm, and 47.3 cm; thicknesses of 6.7 mm, 8.4 mm, and 11.4 mm; relative magnetic permeabilities $\mu_r$ of 80; conductivities σ of 5×10$^6$ S/m. In the simulations, the nested tubulars are eccentered along just the x-axis. The EM logging tool axis is assumed to be along the z-axis passing through the central point (0, 0) of the coordinate system. The positions of the tubulars are with respect to the EM logging tool axis. There are 13 eccentering scenarios, including a first position corresponding to zero eccentering. For cases 2-8, the inner tubular is centered, whereas the outer and intermediate tubulars are eccentered. The center of the intermediate tubular is fixed at x=5.1 cm, and the center of the outer tubular is moved from x=0 cm to x=10.7 cm equal steps. For cases 9-11, the intermediate and outer tubulars are centered, whereas the center of the inner tubular is moved to x=1.7 cm, 3.4 cm, and 5.1 cm, respectively. For cases 12 and 13, the inner and outer tubulars are centered, whereas the center of the intermediate tubular is moved to x=1.7 cm and 3.4 cm. For each eccentering position, three values (3.8 mm, 7.6 mm, and 11.4 cm) of the outer tubular thickness are taken.

Figure 13:
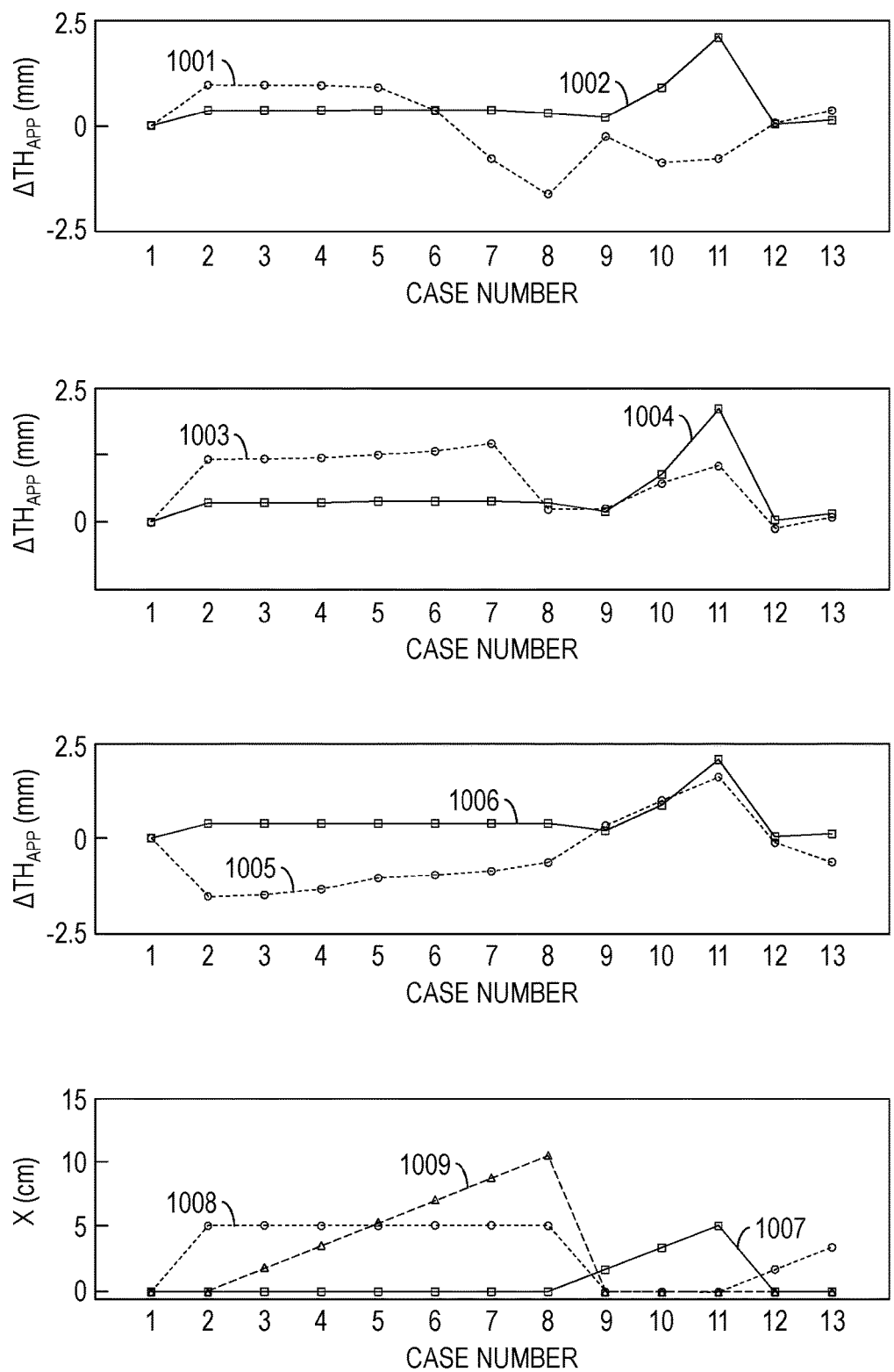
Figure 14:
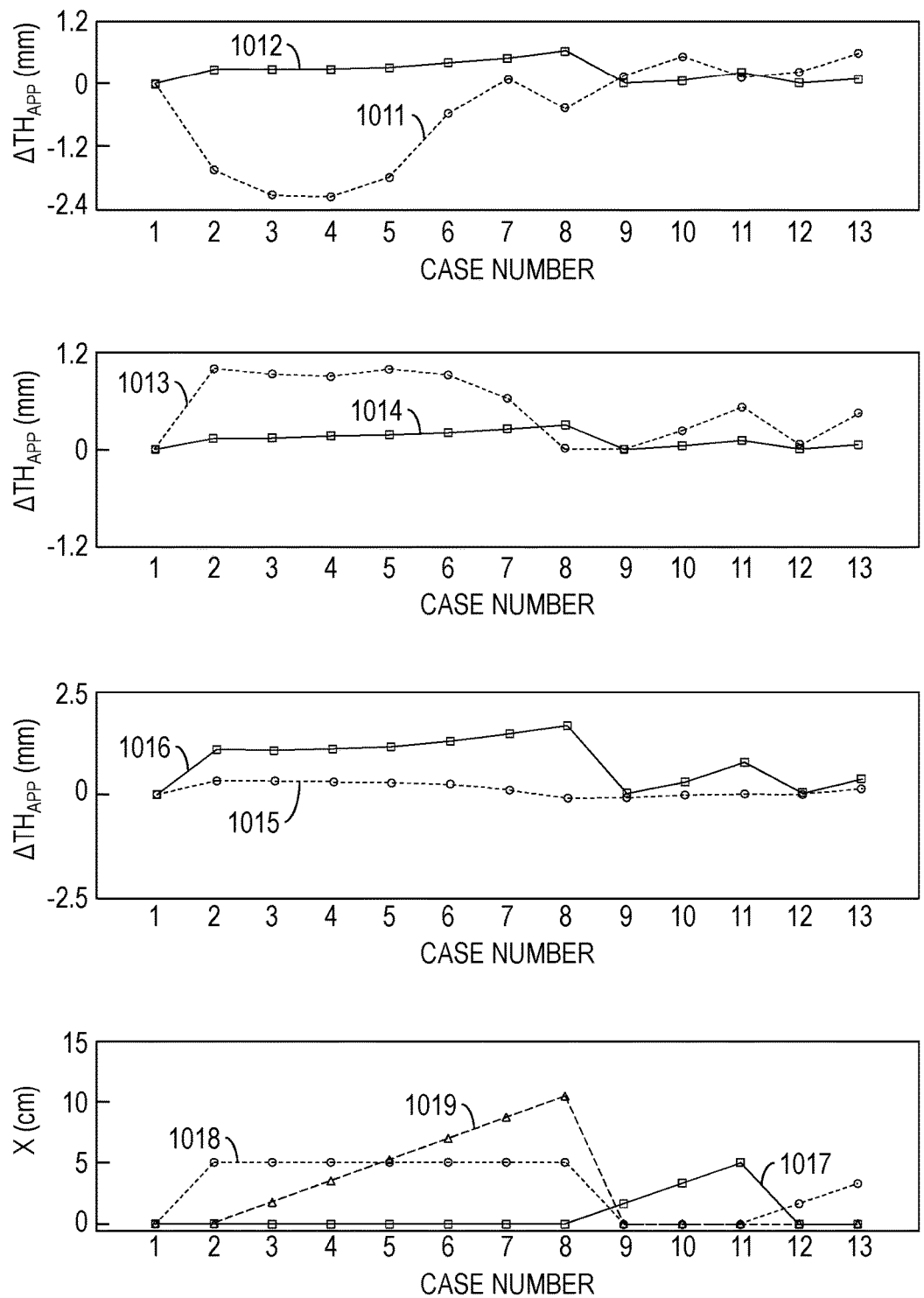

FIGS. 13 and 14 show the difference of apparent thicknesses for the thirteen cases. FIG. 13 is for a receiver/transmitter pair having a midpoint offset 70 such as the receiver 62 and transmitter 60 shown in FIG. 2. FIG. 14 is for a receiver/transmitter pair having a midpoint offset 72 such as the receiver 64 and transmitter 60 shown in FIG. 2.

FIG. 13 depicts separation of apparent thickness difference $\Delta TH_{APP}$ (relative to the case-1 value) as an indicator of casing eccentering with respect to the EM logging tool axis. For an outer tubular nominal thickness of 11.4 mm, curve 1001 depicts $\Delta TH_{APP}$ for phase and curve 1002 depicts $\Delta TH_{APP}$ for attenuation. For an outer tubular nominal thickness of 7.6 mm, curve 1003 depicts $\Delta TH_{APP}$ for phase and curve 1004 depicts $\Delta TH_{APP}$ for attenuation. For an outer tubular nominal thickness of 3.8 mm, curve 1005 depicts $\Delta TH_{APP}$ for phase and curve 1006 depicts $\Delta TH_{APP}$ for attenuation. The type and magnitude of eccentering is shown by curve 1007 for the inner tubular, by curve 1008 for the intermediate tubular, and by curve 1009 for the outer tubular.

In FIG. 14, for an outer tubular nominal thickness of 11.4 mm, curve 1011 depicts $\Delta TH_{APP}$ for phase and curve 1012 depicts $\Delta TH_{APP}$ for attenuation. For an outer tubular nominal thickness of 7.6 mm, curve 1013 depicts $\Delta TH_{APP}$ for phase and curve 1014 depicts $\Delta TH_{APP}$ for attenuation. For an outer tubular nominal thickness of 3.8 mm, curve 1015 depicts $\Delta TH_{APP}$ for phase and curve 1016 depicts $\Delta TH_{APP}$ for attenuation. The type and magnitude of eccentering is shown by curve 1017 for the inner tubular, by curve 1018 for the intermediate tubular, and by curve 1019 for the outer tubular.

FIGS. 13 and 14 illustrate that the separation of apparent thicknesses from phase and attenuation is not that pronounced for case 9, where the inner tubular axis is located at about 1.7 cm. For the other cases, eccentering can be easily flagged based on separation of phase and attenuation apparent thicknesses in either of the shorter spacing measurements.

The present disclosure also relates to an inversion technique for aiding interpretation of EM logging data. The inversion compares the EM logging data with a numerical model. Parameters of the numerical model, such as tubular thicknesses, tubular diameters, and electromagnetic properties, are optimized to best fit the actual EM logging data. For example, if one is interested in the individual thicknesses of the nested tubulars, the inversion technique can be utilized to identify the combination of individual thicknesses that best fits the acquired EM logging data.

Figure 15:
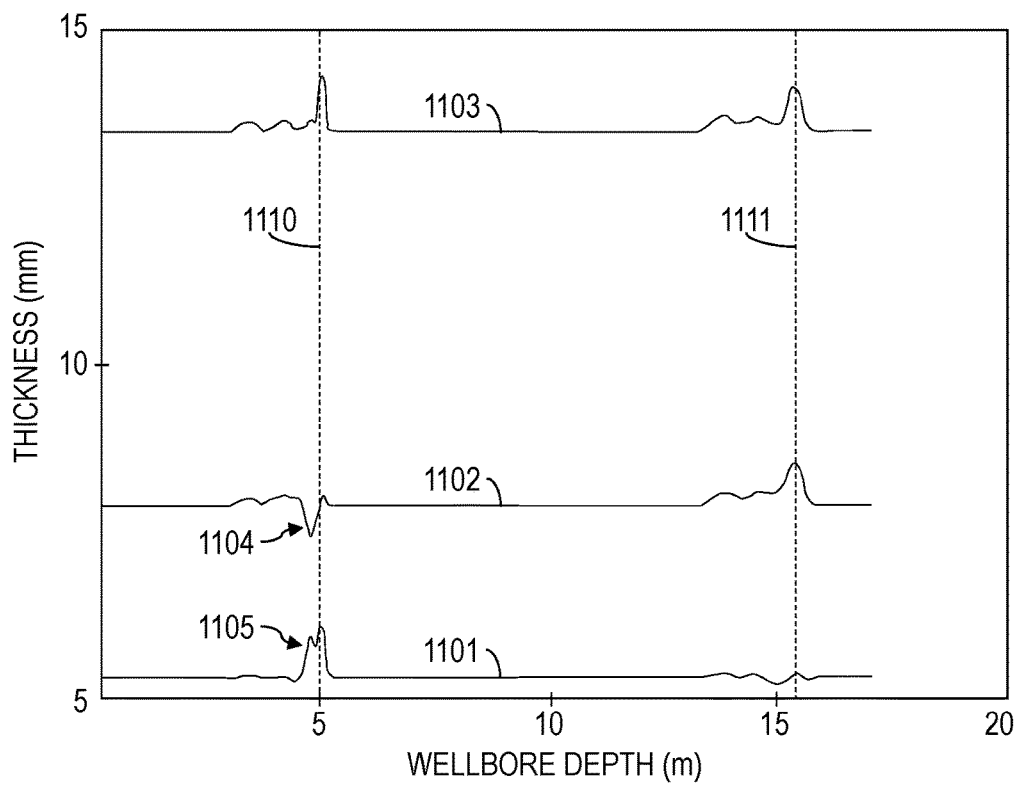

FIG. 15 is a graphical depiction of an example implementation comprising inner and outer nested tubulars, in which a metal ring exists on the inner tubular at a depth 1110 of about 5 m, and another metal ring exists on the outer tubular at a depth 1111 of about 15.5 m. EM logging data was used to generate curve 1101 depicting the inverted thickness of the inner tubular, curve 1102 depicting the inverted thickness of the outer tubular, and curve 1103 depicting the cumulative thickness of the inner and outer tubulars, as returned by the inversion process described above. The curves 1101-1103 indicate a spurious metal loss 1104 on the outer tubular and a virtual metal gain 1105 on the inner tubular.

For nested tubular implementations, ghosts generally have greater impact on individual thicknesses than cumulative thickness. The present disclosure introduces utilizing total cumulative thickness as a discrimination indicator between actual defects and virtual features induced by the ghosting effect. Indeed, when cumulative thickness shows localized metal loss, each individual tubular would show either constant thickness or localized metal loss. Conversely, when cumulative thickness shows localized metal gain, each tubular would show either constant thickness or localized metal gain. This permits distinguishing between actual defects and virtual features. The present disclosure introduces a method for implementing these interpretation criteria better to assess the conditions of nested tubulars.

The method comprises optimizing a cost function that is the sum of several weighted quantities. Each quantity in the cost function is based on the following decision criteria, listed in order of importance. First, the sum of the individual thicknesses is consistent with the inverted cumulative thickness. Second, the thickness measurement of each tubular is consistent with the evolution of cumulative thickness. Specifically, if cumulative thickness is increasing locally, the thickness of each tubular can just increase locally. If cumulative thickness is not substantially changing, the thickness of each tubular does not substantially from its long term average. If cumulative thickness is decreasing locally, the thickness of each tubular can just decrease locally. Third, the thickness of each tubular is consistent with the inverted individual tubular thicknesses.

For an implementation comprising two nested tubulars, the above-described criteria can be implemented via the cost function $C(t'_1, t'_2)$ set forth below in Equation (1).

$$C(t'_1, t'_2) = \frac{1}{2}\alpha \cdot (t'_{tot} \quad \bar{t}_{tot})^2 + \frac{1}{2}\beta \cdot H_a(\bar{t}_{tot} \quad \bar{t}_{tot}) \cdot (\bar{t}_1 \quad t'^2_{1+} + \bar{t}_2 \quad t'^2_{2+}) + \quad (1)$$

$$\frac{1}{2}\beta \cdot H_a(\bar{t}_{tot} \quad \bar{t}_{tot}) \cdot (t'_1 \quad \bar{t}^2_{1+} + t'_2 \quad \bar{t}^2_{2+}) +$$

$$\frac{1}{2}\gamma \cdot ((t'_1 \quad \bar{t}_1)^2 + (t'_2 \quad \bar{t}_2)^2)$$

In this cost function, the weighting coefficients $\alpha$, $\beta$, and $\gamma$ correspond to the weighting of the three criteria listed above. The function $H_a$ is a smoothed Heaviside function and $_+$ indicates the positive part of the argument. The parameters $\tilde{t}_1$, $\tilde{t}_2$, and $\tilde{t}_{tot}$ correspond to the result of the thickness inversion, and the parameters $\bar{t}_1$, $\bar{t}_2$, and $\bar{t}_{tot}$ correspond to the averaged result of the inversion over a certain depth. The parameters $t'_1$, $t'_2$, and $t'_{tot}$ correspond to candidate thickness measurements. The weighting coefficients are chosen to satisfy $\alpha \gg \beta \gg \gamma$ to reflect the priority of the criteria described above.

The output is therefore determined as set forth below in Equation (2).

$$(t_1°, t_2°) = \operatorname{argmin}_{t'_1, t'_2} C(t'_1, t'_2). \quad (2)$$

where the function argmin represents selecting the respective arguments to minimize the function $C(t'_1, t'_2)$. The parameters $t_1°$ and $t_2°$ are the values that achieve or approximate the minimization.

The cost function $C(t'_1, t'_2)$ is positive definite, which ensures existence and uniqueness of its minimum. The minimum is the lone stationary point of the cost function.

The first derivative of the cost function $C(t'_1, t'_2)$ is set forth below in Equation (3).

$$\nabla C(t'_1, t'_2) = \quad (3)$$

$$\alpha \cdot \begin{bmatrix} t'_{tot} & \bar{t}_{tot} \\ t'_{tot} & \bar{t}_{tot} \end{bmatrix} \beta \begin{bmatrix} H_a(\bar{t}_{tot} \quad \bar{t}_{tot}) \cdot \bar{t}_1 & t'_{1+} & H_a(\bar{t}_{tot} \quad \bar{t}_{tot}) \cdot t'_1 & \bar{t}_{1+} \\ H_a(\bar{t}_{tot} \quad \bar{t}_{tot}) \cdot \bar{t}_2 & t'_{2+} & H_a(\bar{t}_{tot} \quad \bar{t}_{tot}) \cdot t'_2 & \bar{t}_{2+} \end{bmatrix} +$$

$$\gamma \begin{bmatrix} t'_1 & \bar{t}_1 \\ t'_2 & \bar{t}_2 \end{bmatrix}$$

The second derivative of the cost function $C(t'_1, t'_2)$ is set forth below in Equation (4).

$$\nabla \nabla C(t'_1, t'_2) = \alpha \begin{bmatrix} 1 & 1 \\ 1 & 1 \end{bmatrix} + \beta \cdot H_a(\bar{t}_{tot} \quad \bar{t}_{tot}) \begin{bmatrix} H(\bar{t}_1 \quad t'_1) & 0 \\ 0 & H(\bar{t}_2 \quad t'_2) \end{bmatrix} + \quad (4)$$

$$\beta \cdot H_a(\bar{t}_{tot} \quad \bar{t}_{tot}) \begin{bmatrix} H(t'_1 \quad \bar{t}_1) & 0 \\ 0 & H(t'_2 \quad \bar{t}_2) \end{bmatrix} + \gamma \begin{bmatrix} 1 & 0 \\ 0 & 1 \end{bmatrix}$$

For implementations comprising more than two nested tubulars, Equations (1)-(4) can be expanded to include additional thickness parameters.

The minimum of the cost function can be found in various manners within the scope of the present disclosure. For example, an iterative Newton-Raphson algorithm can be performed by evaluating the cost function derivative at an initial point $(\tilde{t}_1, \tilde{t}_2)$, and then iteratively (1) if the cost function derivative is smaller than prescribed by the relative tolerance, the values $(t'_1, t'_2)$ are returned, and (2) determining an improved estimate of the minimum as set forth below in Equation (5).

$$\begin{bmatrix} t'_1 \\ t'_2 \end{bmatrix}_{n+1} = \begin{bmatrix} t'_1 \\ t'_2 \end{bmatrix}_n \left( \nabla \nabla C \left( \begin{bmatrix} t'_1 \\ t'_2 \end{bmatrix}_n \right) \right)^{-1} \nabla C \left( \begin{bmatrix} t'_1 \\ t'_2 \end{bmatrix}_n \right) \quad (5)$$

Such iteration is continued until convergence. The optimized values are then output for the thickness estimates. Since the cost function is relatively smooth, convergence may be achieved in just a few iterations. Other optimization techniques described in the literature may be used altogether, such as steepest descent algorithm, Monte Carlo optimization, etc.

Figure 16:
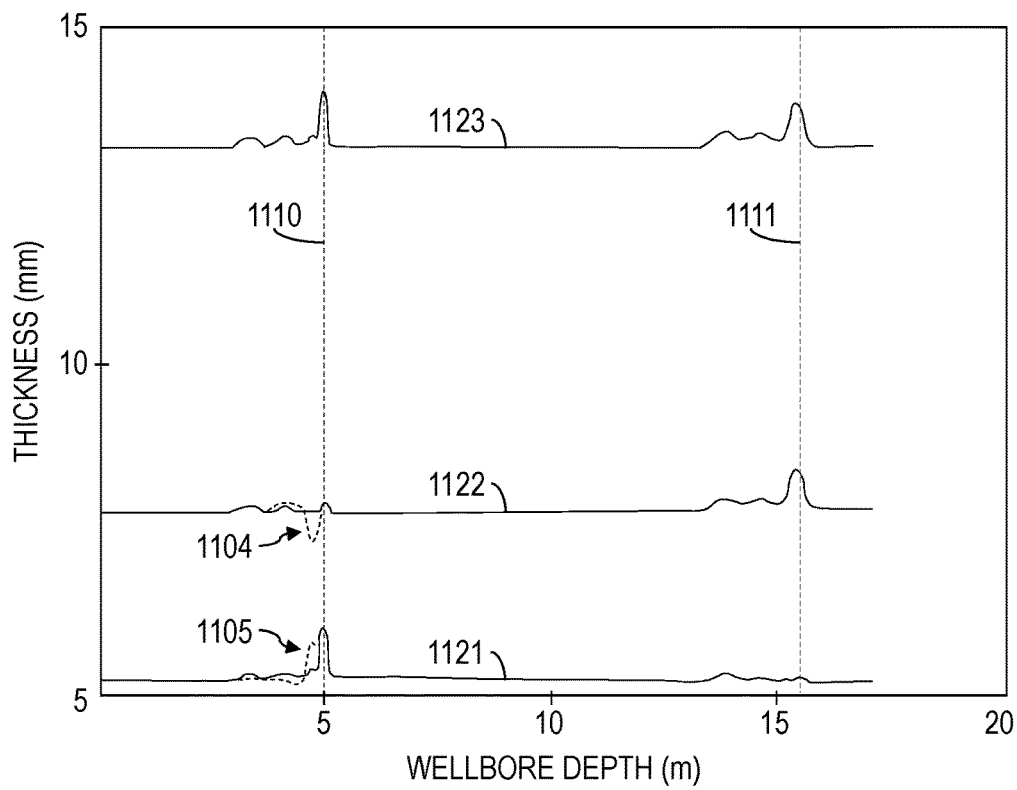

This cost function technique has been tested utilizing experimental data. For example, FIG. 16 is a graphical depiction of post-processing results for the implementation depicted in FIG. 15. The curves 1101-1103 shown in FIG. 15 are depicted by dashed lines in FIG. 16. EM logging data was used to generate curve 1121 depicting the corrected thickness of the inner tubular, curve 1122 depicting the corrected thickness of the outer tubular, and curve 1123 depicting the corrected cumulative thickness of the inner and outer tubulars. The curves 1121-1123 indicate successful removal of the spurious metal loss 1104 on the outer tubular and the virtual metal gain 1105 on the inner tubular.

It is also contemplated that other cost functions can similarly be employed within the scope of the present disclosure. One such example is a cost function formed with a product of quantities that may be raised to various exponent powers, rather than a sum of weighted quantities. Minimization of such cost functions can correspondingly be performed to estimate individual thicknesses of the nested tubulars.

Figure 17:
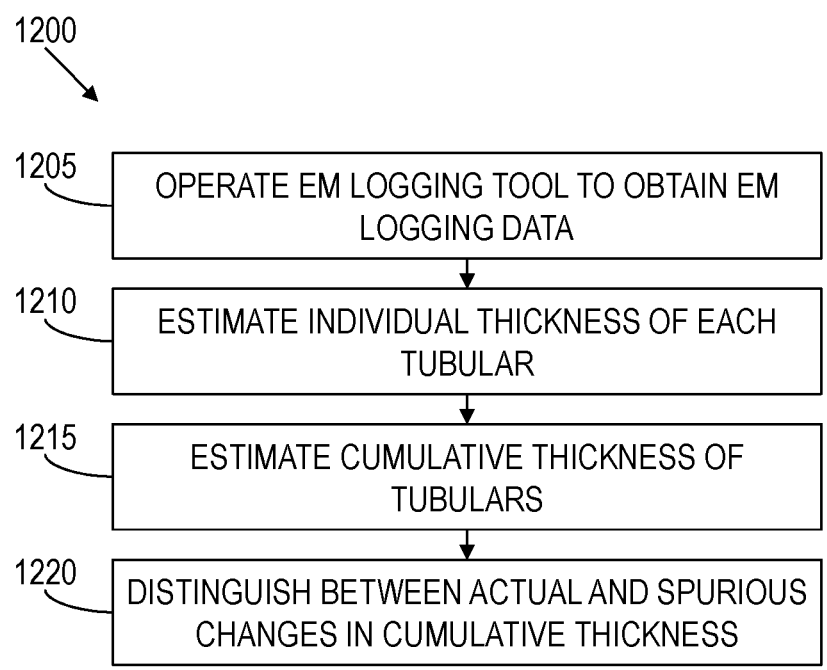
FIG. 17 is a flow-chart diagram of at least a portion of an example implementation of a method according to one or more aspects of the present disclosure.

FIG. 17 is a flow-chart diagram of at least a portion of an example implementation (1200) of the inversion-convergence method described above. The method (1200) may be performed utilizing at least a portion of one or more implementations of the apparatus shown in FIGS. 1-4 and/or otherwise within the scope of the present disclosure.

The method comprises operating (1205) an EM logging tool within two or more nested tubulars in a wellbore. Data obtained via the EM logging tool is utilized to estimate (1210) an individual thickness of each tubular at each of a plurality of depths within the wellbore. The estimated individual thicknesses are then utilized to estimate (1215) a cumulative thickness of the tubulars at each depth. Local variations of the estimated cumulative thicknesses are then utilized to distinguish (1220) between actual and spurious indications of differences between the estimated (1215) cumulative thicknesses at neighboring depths. As described above, the spurious indications may result from corresponding ones of the estimated (1210) individual thicknesses that are inaccurate due to dissimilar midpoint offsets and/or other depth-sensitivities of EM receivers of the EM logging tool.

As also described above, utilizing the local variations to distinguish (1220) between the actual and spurious indications may comprise minimizing a cost function, which is a function of candidate ones of the estimated individual thicknesses, such as set forth above in Equation (1). The cost function may penalize apparent decreases in the estimated (1210) individual thicknesses of individual ones of the tubulars relative to sequential ones of the depths when the estimated (1215) cumulative thicknesses increase relative to the sequential depths. Similarly, the cost function may penalize apparent increases in the estimated (1210) individual thicknesses of individual ones of the tubulars relative to sequential ones of the depths when the estimated (1215) cumulative thicknesses decrease relative to the sequential depths.

For example, distinguishing (1220) between the actual and spurious indications may comprise: (A) determining a first quantity expressing a first cost dependent on a difference between: (i) a first candidate thickness of a first one of the tubulars at a first one of the depths; and (ii) an inversion thickness produced by an inversion of a characteristic (measured or sensed by the EM logging tool, such as phase and/or attenuation) employing a numerical casing thickness model; (B) determining a second quantity expressing a second cost dependent on a difference between: (i) the first candidate thickness; and (ii) an average of initially determined thicknesses of the first tubular produced from the inversion employing the model at each of the depths; (C) determining a third quantity expressing a third cost dependent on a difference between: (i) the first candidate thickness; and (ii) a first model thickness of the first tubular at the first depth produced by the model; (D) determining a fourth quantity expressing a fourth cost dependent on a difference between: (i) a sum of the first candidate thickness and a second candidate thickness of a second one of the tubulars at the first depth; and (ii) a sum of the first model thickness and a second model thickness of the second tubular at the first depth produced by the model; and (E) determining an estimated thickness of the first tubular at the first depth based on a cost function comprising the first, second, third, and fourth quantities. Such technique may also be employed for implementations comprising two or more nest tubulars. For example, if a third tubular is nested within first and second tubulars, the sum of the first and second candidate thicknesses may include a third candidate thickness of the third tubular at the first depth, and the sum of the first and second model thicknesses may include a third model thickness of the third tubular at the first depth produced by the model.

Figure 18:
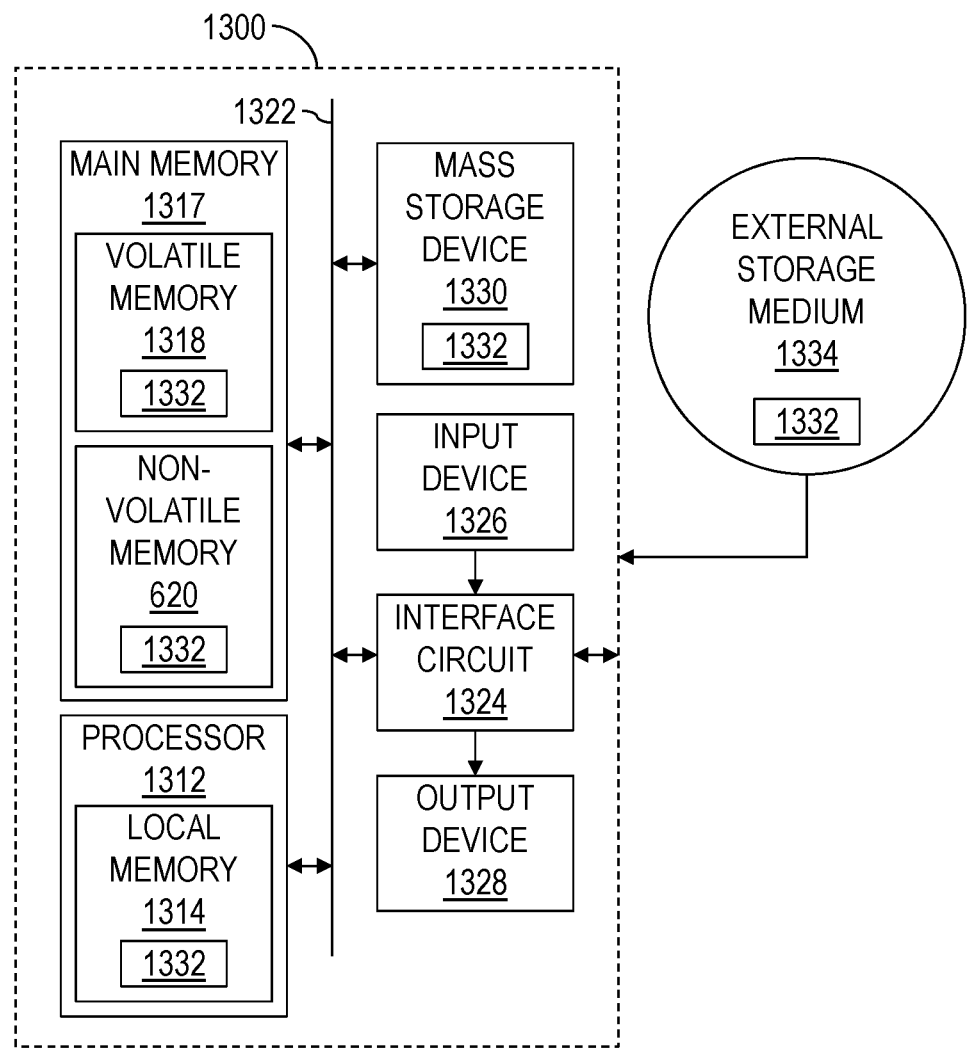
FIG. 18 is a schematic diagram of at least a portion of an example implementation of a processing system according to one or more aspects of the present disclosure.

FIG. 18 is a schematic view of at least a portion of an example implementation of a processing system 1300 according to one or more aspects of the present disclosure. The processing system 1300 may execute example machine-readable instructions to implement at least a portion of one or more of the methods and/or processes described herein. For example, the processing system 1300 may execute example machine-readable instructions to perform at least portions of the method 900 shown in FIG. 10 and/or the method 1200 shown in FIG. 17, among other examples of methods within the scope of the present disclosure. The processing system 1300 may be implemented in a portion of one or more of the example surface equipment at a wellsite and/or a portion of one or more of the example EM logging tools described herein. The processing system 1300 may be or comprise, for example, one or more processors, controllers, special-purpose computing devices, servers, personal computers, personal digital assistant (PDA) devices, smartphones, internet appliances, and/or other types of computing devices.

The processing system 1300 comprises a processor 1312 such as, for example, a general-purpose programmable processor. The processor 1312 may comprise a local memory 1314, and may execute program code instructions 1332 present in the local memory 1314 and/or in another memory device. The processor 1312 may execute, among other things, machine-readable instructions or programs to implement the methods and/or processes described herein. The programs stored in the local memory 1314 may include program instructions or computer program code that, when executed by an associated processor, enable a microrheology system, surface equipment, and/or a downhole tool to perform tasks as described herein. The processor 1312 may be, comprise, or be implemented by one or more processors of various types operable in the local application environment, and may include one or more general purpose processors, special-purpose processors, microprocessors, digital signal processors (DSPs), field-programmable gate arrays (FPGAs), application-specific integrated circuits (ASICs), processors based on a multi-core processor architecture, and/or other processors. More particularly, examples of a processor 1312 include one or more INTEL microprocessors, microcontrollers from the ARM and/or PICO families of microcontrollers, embedded soft/hard processors in one or more FPGAs, etc.

The processor 1312 may be in communication with a main memory 1317, such as via a bus 1322 and/or other communication means. The main memory 1317 may comprise a volatile memory 1318 and a non-volatile memory 1320. The volatile memory 1318 may be, comprise, or be implemented by tangible, non-transitory storage medium, such as random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 1320 may be, comprise, or be implemented by tangible, non-transitory storage medium, such as read-only memory, flash memory and/or other types of memory devices. One or more memory controllers (not shown) may control access to the volatile memory 1318 and/or the non-volatile memory 1320.

The processing system 1300 may also comprise an interface circuit 1324. The interface circuit 1324 may be, comprise, or be implemented by various types of standard interfaces, such as an Ethernet interface, a universal serial bus (USB), a third generation input/output (3GIO) interface, a wireless interface, and/or a cellular interface, among other examples. The interface circuit 1324 may also comprise a graphics driver card. The interface circuit 1324 may also comprise a communication device such as a modem or network interface card to facilitate exchange of data with external computing devices via a network, such as via Ethernet connection, digital subscriber line (DSL), telephone line, coaxial cable, cellular telephone system, and/or satellite, among other examples.

One or more input devices 1326 may be connected to the interface circuit 1324. One or more of the input devices 1326 may permit a user to enter data and/or commands for utilization by the processor 1312. Each input device 1326 may be, comprise, or be implemented by a keyboard, a mouse, a touchscreen, a track-pad, a trackball, an image/code scanner, and/or a voice recognition system, among other examples.

One or more output devices 1328 may also be connected to the interface circuit 1324. One or more of the output device 1328 may be, comprise, or be implemented by a display device, such as a liquid crystal display (LCD), a light-emitting diode (LED) display, and/or a cathode ray tube (CRT) display, among other examples. One or more of the output devices 1328 may also or instead be, comprise, or be implemented by a printer, speaker, and/or other examples.

The processing system 1300 may also comprise a mass storage device 1330 for storing machine-readable instructions and data. The mass storage device 1330 may be connected to the interface circuit 1324, such as via the bus 1322. The mass storage device 1330 may be or comprise tangible, non-transitory storage medium, such as a floppy disk drive, a hard disk drive, a compact disk (CD) drive, and/or digital versatile disk (DVD) drive, among other examples. The program code instructions 1332 may be stored in the mass storage device 1330, the volatile memory 1318, the non-volatile memory 1320, the local memory 1314, and/or on a removable storage medium 1334, such as a CD or DVD.

The modules and/or other components of the processing system 1300 may be implemented in accordance with hardware (such as in one or more integrated circuit chips, such as an ASIC), or may be implemented as software or firmware for execution by a processor. In the case of firmware or software, the implementation can be provided as a computer program product including a computer readable medium or storage structure containing computer program code (i.e., software or firmware) for execution by the processor.

In view of the entirety of the present disclosure, including the claims and the figures, a person having ordinary skill in the art will readily recognize that the present disclosure introduces a method comprising: operating an EM logging tool within a plurality of tubulars nested within a wellbore, wherein the downhole tool comprises an EM transmitter, a first EM receiver, and a second EM receiver; determining a first apparent cumulative thickness of the tubulars employing data generated via the first EM receiver; determining a second apparent cumulative thickness of the tubulars employing data generated via the second EM receiver; producing a deghosted thickness as a minimum of the first and the second apparent cumulative thicknesses; identifying collar-free sections of the tubulars based on the deghosted thickness; for each collar-free section, producing an adjusted deghosted apparent cumulative thickness by employing a maximum of the first and second apparent cumulative thicknesses; and assigning the adjusted deghosted apparent cumulative thickness to the first and second apparent cumulative thicknesses.

The first and second apparent cumulative thicknesses may each be nominal cumulative thicknesses of the tubulars in areas having no collars connecting the tubulars, and having no apparent defects.

The collar-free sections may be identified as being at least a predetermined distance away from a high thickness gradient associated with collars connecting the tubulars. The predetermined distance may be about 0.25 meters.

The data generated via the first and second EM receivers may include or indicate attenuation and/or phase information.

Spacings between the EM transmitter and the first and second EM receivers may each be more than the length of an antenna of the EM transmitter.

The first and second EM receivers may be located respectively at $P_{R1}$ and $P_{R2}$ unit lengths from the EM transmitter such that $2.5*OD_{max} < P_{R1} < P_{R2}$, where $OD_{max}$ is outer diameter of an outermost one of the tubulars.

The present disclosure also introduces a method comprising: operating an EM logging tool within a plurality of tubulars nested within a wellbore, wherein the downhole tool comprises an EM transmitter and at least one EM receiver; determining apparent cumulative thicknesses of the tubulars employing data generated via the at least one EM receiver using measured phase and attenuation; and identifying relative eccentering of the tubulars based on separations of the apparent cumulative thicknesses from phase and attenuation occurring at the same depth.

Spacing between the EM transmitter and the at least one EM receiver may be less than 2.5 times an outer diameter of an outermost one of the tubulars.

At least one of the apparent cumulative thicknesses may be greater than a nominal value of the other apparent cumulative thicknesses over a predetermined interval of the data.

The present disclosure also introduces a method comprising: operating an EM logging tool within a plurality of tubulars nested within a wellbore, wherein the downhole tool comprises an EM transmitter and a plurality of EM receivers; utilizing data obtained via the EM receivers to estimate an individual thickness of each tubular at each of a plurality of depths within the wellbore; utilizing the estimated individual thicknesses to estimate a cumulative thickness of the tubulars at each depth; and utilizing local variations of the estimated cumulative thicknesses to distinguish between actual and spurious indications of differences between the estimated individual thicknesses at neighboring depths.

The spurious indications may result from dissimilar depth-sensitivities of the EM receivers.

Utilizing the local variations to distinguish between the actual and spurious indications may comprise minimizing a cost function, which may be a function of candidate ones of the estimated individual thicknesses. The cost function may enforce conservation of the estimated cumulative thicknesses. The cost function may penalize apparent decreases in the estimated individual thicknesses of individual ones of the tubulars relative to sequential ones of the depths when the estimated cumulative thicknesses increase relative to the sequential depths. The cost function may penalize apparent increases in the estimated individual thicknesses of individual ones of the tubulars relative to sequential ones of the depths when the estimated cumulative thicknesses decrease relative to the sequential depths.

The EM transmitter may be operable to generate a first EM field that generates eddy currents in the tubulars, the EM receivers may each be operable to measure a characteristic of a second EM field generated by the eddy currents, and the tubulars may include a first tubular and a second tubular. In such implementations, among others within the scope of the present disclosure, distinguishing between the actual and spurious indications may comprise determining: (A) a first quantity expressing a first cost dependent on a difference between: (1) a first candidate thickness of the first tubular at a first one of the depths; and (2) an inversion thickness produced by an inversion of the characteristic employing a numerical casing thickness model; (B) a second quantity expressing a second cost dependent on a difference between: (1) the first candidate thickness; and (2) an average of initially determined thicknesses of the first tubular produced from the inversion employing the model at each of the depths; (C) a third quantity expressing a third cost dependent on a difference between: (1) the first candidate thickness; and (2) a first model thickness of the first tubular at the first depth produced by the model; (D) a fourth quantity expressing a fourth cost dependent on a difference between: (1) a sum of the first candidate thickness and a second candidate thickness of the second tubular at the first depth; and (2) a sum of the first model thickness and a second model thickness of the second tubular at the first depth produced by the model; and (E) an estimated thickness of the first tubular at the first depth based on a cost function comprising the first, second, third, and fourth quantities. The characteristic may be a first characteristic, and the EM receivers may each be further operable to measure a second characteristic of the second EM field. For example, the first and second characteristics may be phase and attenuation.

The EM transmitter may be a first EM transmitter, the eddy currents may be first eddy currents, the EM logging tool may further comprise a second EM transmitter operable to generate a third EM field that generates second eddy currents in the tubulars, and the EM receivers may each be further operable to measure the characteristic from a fourth EM field generated by the second eddy currents.

A third tubular may be nested with the first and second tubulars, the sum of the first and second candidate thicknesses may include a third candidate thickness of the third tubular at the first depth, and the sum of the first and second model thicknesses may include a third model thickness of the third tubular at the first depth produced by the model.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. A method comprising:
    operating an electromagnetic (EM) logging tool within a plurality of tubulars nested within a wellbore, wherein the EM logging tool comprises an EM transmitter, a first EM receiver, and a second EM receiver;
    determining a first apparent cumulative thickness of the tubulars employing data generated via the first EM receiver;
    determining a second apparent cumulative thickness of the tubulars employing data generated via the second EM receiver;
    producing a deghosted thickness as a minimum of the first and the second apparent cumulative thicknesses;
    identifying collar-free sections of the tubulars based on the deghosted thickness;
    for each collar-free section, producing an adjusted deghosted apparent cumulative thickness by employing a maximum of the first and second apparent cumulative thicknesses; and
    assigning the adjusted deghosted apparent cumulative thickness to the first and second apparent cumulative thicknesses.

2. The method of claim 1 wherein the first and second apparent cumulative thicknesses are each nominal cumulative thicknesses of the tubulars in areas having no collars connecting the tubulars, and having no apparent defects.

3. The method of claim 1 wherein the collar-free sections are identified as being at least a predetermined distance away from a high thickness gradient associated with collars connecting the tubulars.

4. The method of claim 1 wherein the data generated via the first and second EM receivers are attenuation and/or phase.

5. The method of claim 1 wherein spacings between the EM transmitter and the first and second EM receivers are each more than a length of an antenna of the EM transmitter.

6. The method of claim 1 wherein the first and second EM receivers are located respectively at $P_{R1}$ and $P_{R2}$ unit lengths from the EM transmitter such that $2.5*OD_{max} < P_{R1} < P_{R2}$, where $OD_{max}$ is outer diameter of an outermost one of the tubulars.

7. A method comprising:
    operating an electromagnetic (EM) logging tool within a plurality of tubulars nested within a wellbore, wherein the EM logging tool comprises an EM transmitter and at least one EM receiver;
    determining apparent cumulative thicknesses of the tubulars employing data generated via the at least one EM receiver using measured phase and attenuation; and
    identifying relative eccentering of the tubulars based on separations of the apparent cumulative thicknesses from phase and attenuation occurring at the same depth,
    wherein at least one of the apparent cumulative thicknesses is greater than a nominal value of the other apparent cumulative thicknesses over a predetermined interval of the data.

8. The method of claim 7 wherein spacing between the EM transmitter and the at least one EM receiver is less than 2.5 times an outer diameter of an outermost one of the tubulars.

9. A method comprising:
    operating an electromagnetic (EM) logging tool within a plurality of tubulars nested within a wellbore, wherein the EM logging tool comprises an EM transmitter and a plurality of EM receivers;

utilizing data obtained via the EM receivers to estimate an individual thickness of each tubular at each of a plurality of depths within the wellbore;
utilizing the estimated individual thicknesses to estimate a cumulative thickness of the tubulars at each depth; and
utilizing local variations of the estimated cumulative thicknesses to distinguish between actual and spurious indications of differences between the estimated individual thicknesses at neighboring depths.

10. The method of claim 9 wherein the spurious indications result from dissimilar depth-sensitivities of the EM receivers.

11. The method of claim 9 wherein utilizing the local variations to distinguish between the actual and spurious indications comprises minimizing a cost function, which is a function of candidate ones of the estimated individual thicknesses.

12. The method of claim 11 wherein the cost function enforces conservation of the estimated cumulative thicknesses.

13. The method of claim 11 wherein the cost function penalizes apparent decreases in the estimated individual thicknesses of individual ones of the tubulars relative to sequential ones of the depths when the estimated cumulative thicknesses increase relative to the sequential depths.

14. The method of claim 11 wherein the cost function penalizes apparent increases in the estimated individual thicknesses of individual ones of the tubulars relative to sequential ones of the depths when the estimated cumulative thicknesses decrease relative to the sequential depths.

15. The method of claim 9 wherein:
the EM transmitter is operable to generate a first EM field that generates eddy currents in the tubulars;
the EM receivers are each operable to measure a characteristic of a second EM field generated by the eddy currents;
the tubulars include a first tubular and a second tubular; and
distinguishing between the actual and spurious indications comprises determining:
a first quantity expressing a first cost dependent on a difference between:
a first candidate thickness of the first tubular at a first one of the depths; and
an inversion thickness produced by an inversion of the characteristic employing a numerical casing thickness model;
a second quantity expressing a second cost dependent on a difference between:
the first candidate thickness; and
an average of initially determined thicknesses of the first tubular produced from the inversion employing the model at each of the depths;
a third quantity expressing a third cost dependent on a difference between:
the first candidate thickness; and
a first model thickness of the first tubular at the first depth produced by the model;
a fourth quantity expressing a fourth cost dependent on a difference between:
a sum of the first candidate thickness and a second candidate thickness of the second tubular at the first depth; and
a sum of the first model thickness and a second model thickness of the second tubular at the first depth produced by the model; and
an estimated thickness of the first tubular at the first depth based on a cost function comprising the first, second, third, and fourth quantities.

16. The method of claim 15 wherein the characteristic is a first characteristic, and wherein the EM receivers are each further operable to measure a second characteristic of the second EM field.

17. The method of claim 16 wherein the first and second characteristics are phase and attenuation.

18. The method of claim 15 wherein:
the EM transmitter is a first EM transmitter;
the eddy currents are first eddy currents;
the EM logging tool further comprises a second EM transmitter operable to generate a third EM field that generates second eddy currents in the tubulars; and
the EM receivers are each further operable to measure the characteristic from a fourth EM field generated by the second eddy currents.

19. The method of claim 15 wherein:
a third tubular is nested with the first and second tubulars;
the sum of the first and second candidate thicknesses includes a third candidate thickness of the third tubular at the first depth; and
the sum of the first and second model thicknesses includes a third model thickness of the third tubular at the first depth produced by the model.

* * * * *